US011903102B1

(12) United States Patent
Lassar et al.

(10) Patent No.: US 11,903,102 B1
(45) Date of Patent: Feb. 13, 2024

(54) DEFOGGING SYSTEM USING A TRANSPARENT CONDENSATION SENSOR AND HEATER

(71) Applicant: Waymo LLC, Mountain View, CA (US)

(72) Inventors: Noah Lassar, Santa Cruz, CA (US); Yiwei Wang, Sunnyvale, CA (US)

(73) Assignee: Waymo LLC, Moutain View, CA (US)

( * ) Notice: Subject to any disclaimer, the term of this patent is extended or adjusted under 35 U.S.C. 154(b) by 491 days.

(21) Appl. No.: 17/106,385

(22) Filed: Nov. 30, 2020

(51) Int. Cl.
| | | |
|---|---|---|
| *H05B 3/84* | (2006.01) | |
| *H05B 1/02* | (2006.01) | |
| *H05B 3/34* | (2006.01) | |
| *B60S 1/56* | (2006.01) | |
| *B60H 1/00* | (2006.01) | |
| *B60S 1/02* | (2006.01) | |

(52) U.S. Cl.
CPC ........... *H05B 3/84* (2013.01); *B60H 1/00785* (2013.01); *B60S 1/026* (2013.01); *B60S 1/56* (2013.01); *H05B 1/0236* (2013.01); *H05B 3/34* (2013.01); *H05B 2203/013* (2013.01)

(58) Field of Classification Search
CPC .......... H05B 3/84; H05B 1/0236; H05B 3/34; H05B 2203/013; B60H 1/00785; B60S 1/026; B60S 1/56
See application file for complete search history.

(56) References Cited

U.S. PATENT DOCUMENTS

| | | | |
|---|---|---|---|
| 5,471,036 A | 11/1995 | Sperbeck | |
| 6,144,017 A | 11/2000 | Millett et al. | |
| 10,247,854 B2 * | 4/2019 | Zhu | ......................... G01S 17/87 |
| 2018/0046183 A1 * | 2/2018 | Peters | .................. G05D 1/0088 |

FOREIGN PATENT DOCUMENTS

EP            2031934 A2 *    3/2009    ............... H05B 3/84

OTHER PUBLICATIONS

Cell MicroControls, Transparent ITO Heaters, WWW: http://www.cellmc.com; Email: info@cellmc.com, retrieved from the internet Jun. 2, 2020.

(Continued)

*Primary Examiner* — Dana Ross
*Assistant Examiner* — Joe E Mills, Jr.
(74) *Attorney, Agent, or Firm* — Botos Churchill IP Law LLP

(57) ABSTRACT

The technology relates to keeping sensors of a perception system optically clear and free from condensation. A transparent film, such as Indium Tin Oxide (ITO), acts as a moisture sensor that covers the optical area of interest. When a measured value of the moisture sensor meets a certain threshold that indicates the presence of condensate, power is applied to the sensor, turning it into a heater. When the measured value no longer meets the threshold, power is removed and heating ceases. The ITO layer may be lithographically applied to a glass sensor cover or other window, with interleaved sections of material that are spaced closely to detect a minimum amount of condensate. This arrangement enables the system to be employed in sensor assemblies at various locations along a self-driving vehicle, and can be used with different types of sensors such as lidar sensors, cameras and other imaging devices.

20 Claims, 20 Drawing Sheets

(56) References Cited

OTHER PUBLICATIONS

Northeast Flex Heaters Inc., ITO Transparent Heaters, http://northeastflex.com/transparent-heaters/ito-transparent-heaters/, retrieved from internet on Apr. 16, 2020, pp. 1-2.
Belo, G.S., et al., A simplified reactive thermal evaporation method for indium tin oxide electrodes, Applied Surface Science, Article in Press, 2008, pp. 1-3.
Kato, Kentaro, et al., Current-driven phase-change optical gate switch using indium-tin-oxide heater, Open Access, Applied Physics Express 10, 072201 (2017), pp. 1-4.
Kim, Chaewon, et al., A highly efficient indium tin oxide nanoparticles (ITO-NPs) transparent heater based on solution-process optimized with oxygen vacancy control, Journal of Alloys and Compounds, 2017, pp. 713-719.
Luff, B. J., et al., Indium Tin Oxide Overlayered Waveguides for Sensor Applications, Optoelectronics Research Centre University of Southampton, 1997, pp. 1-12.

\* cited by examiner

150

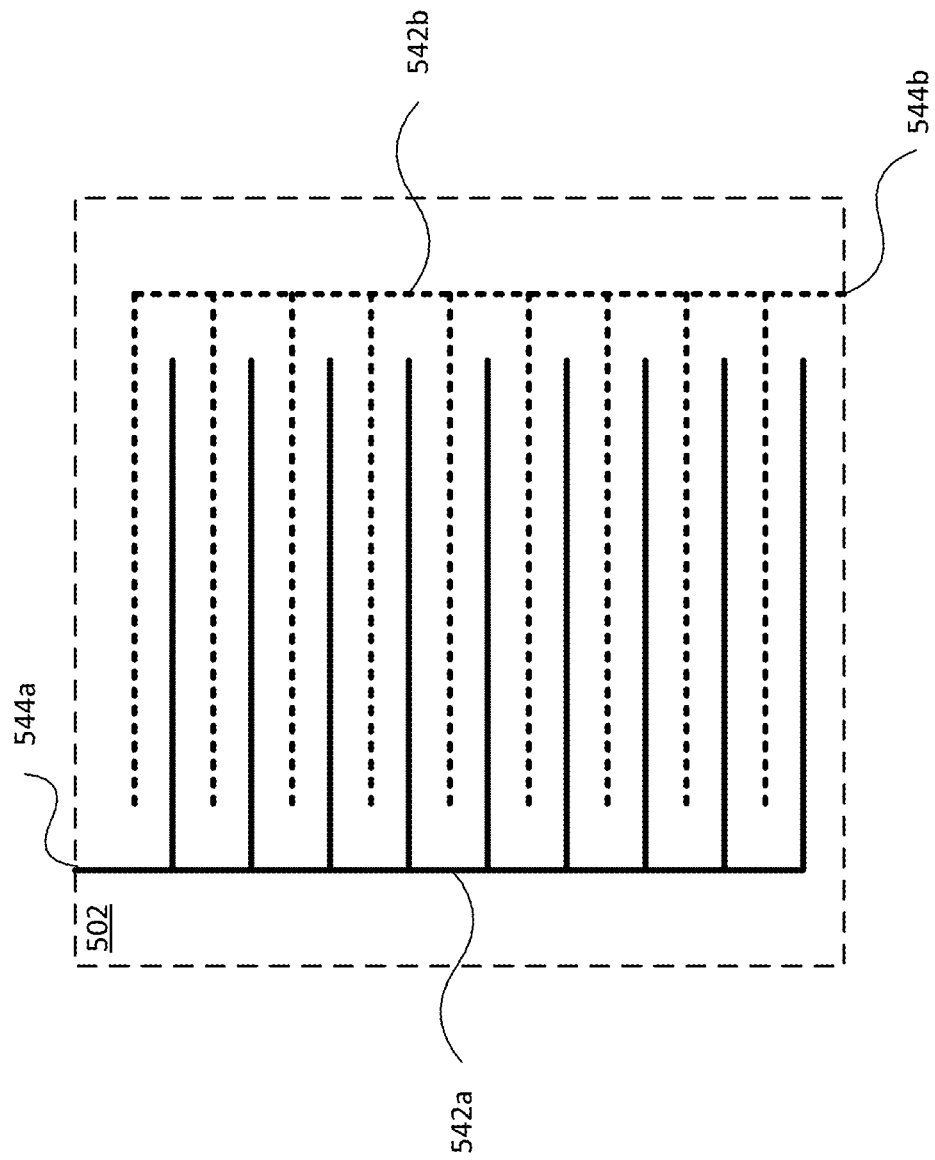

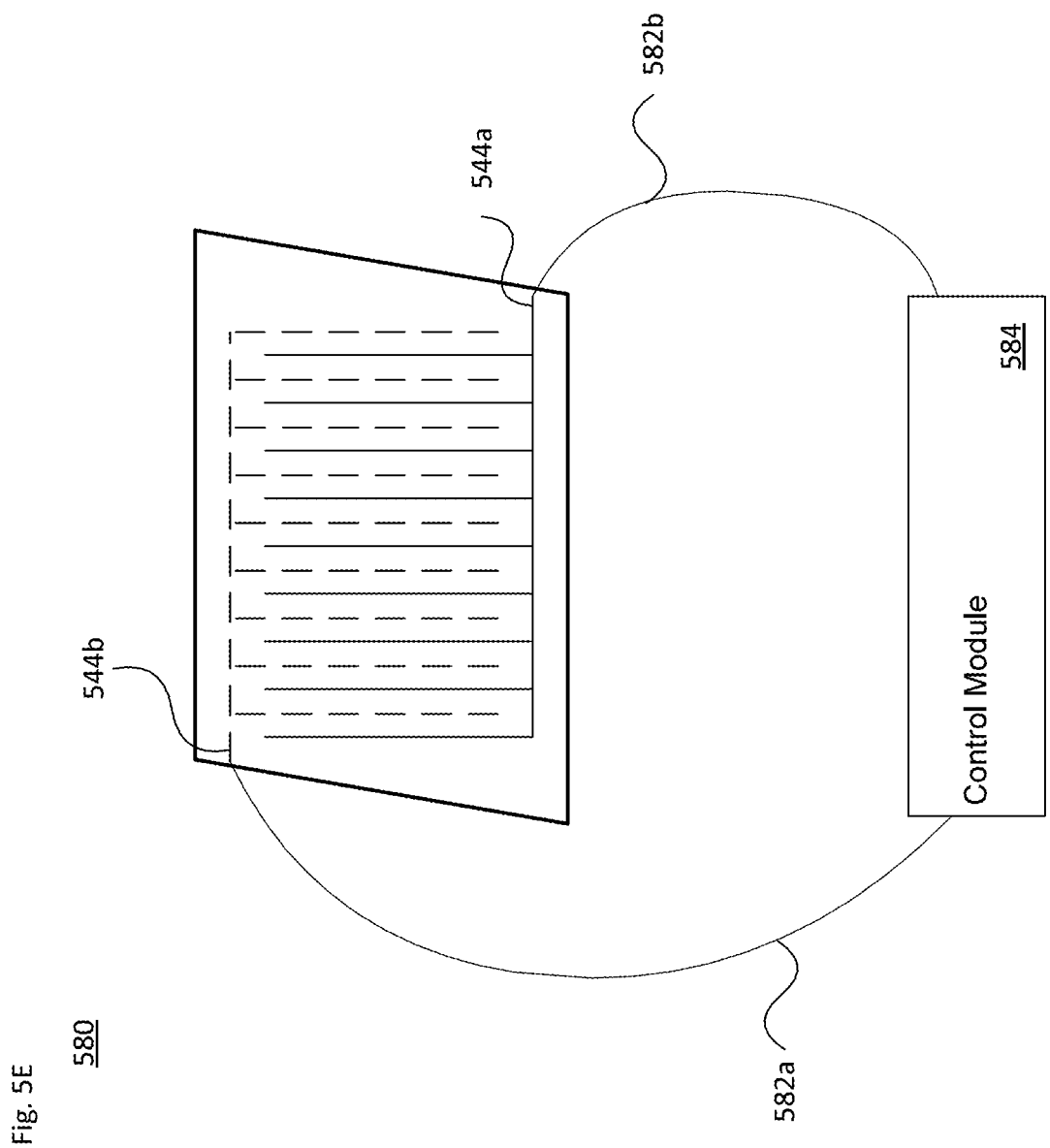

700

DEFOGGING SYSTEM USING A TRANSPARENT CONDENSATION SENSOR AND HEATER

BACKGROUND

Self-driving vehicles that operate in an autonomous driving mode may transport passengers and cargo or other items from one location to another. During operation, sensors of a perception system provide real-time information about other objects in the environment. Signals received by sensors located onboard a vehicle may be degraded due to various reasons, including condensation on the lens or other cover of the sensor. Degradation of the transmitted or received signals can limit the ability of the perception system to detect objects in the surrounding environment, which may adversely impact the ability of the vehicle to operate in a self-driving mode or to provide warnings to a driver in a manual driving mode. While rain, humidity or time-of-wetness sensors can be used, they may be unable to detect small amounts of condensate across a large active optical area, may obscure a portion of a sensor's viewing window, or may not be able to effectively keep different types of sensors on different parts of a vehicle clear of condensation.

BRIEF SUMMARY

The technology relates to external sensors for perception systems of vehicles configured to operate in an autonomous driving mode. More particularly, aspects of the technology involve keeping sensors (e.g., lidar sensors, cameras and other imaging devices) optically clear and free from condensate and fog. An optically transparent film acts as a moisture sensor, covering the optical area of interest. When the measured value of the impedance of the sensor drops below a threshold that indicates the presence of condensate, power is applied to the sensor, turning it into a heater. When the impedance rises above the condensate threshold, power is removed and heating ceases.

According to one aspect of the technology, a sensor assembly comprises a cover element, a sensor device, a moisture sensing and heating layer and a control module. The cover element is disposed in a window of the sensor assembly, and is configured to pass signals of one or more wavelengths therethrough. The cover element has a first side and a second side opposite the first side. The sensor device is configured to perform at least one of emit or receive signals of the one or more wavelengths through the cover element. The sensor device is disposed along the first side of the cover element. The moisture sensing and heating layer is disposed on the first or second side of the cover element. The moisture sensing and heating layer has a pair of electrically conductive complementary elements spaced apart a selected distance from one another. The pair of complementary elements covers an area of the first or second side of the cover element in a pattern and being transparent to the one or more wavelengths. The control module is operatively coupled to the pair of complementary elements. The control module is configured to detect presence of moisture along the cover element of the sensor assembly based on signals received from the pair of complementary elements; upon a determination from the signals that the moisture exceeds a threshold value, cause the pair of complementary elements to heat up to dissipate the moisture; and upon a determination from the signals that the moisture falls below the threshold value, cause the pair of complementary elements to cease heating.

In one example, the pair of electrically conductive complementary elements each comprises Indium Tin Oxide (ITO). The ITO may be disposed as a film on the first or second side of the cover element. The film may be formed lithographically. The cover element may comprise glass, polycarbonate, sapphire or silicon.

The pair of electrically conductive complementary elements are spaced apart a selected distance according to a predetermined sensitivity level for moisture detection. The selected distance in one scenario is on the order of 0.1 mm. In another scenario, the selected distance between the pair of electrically conductive complementary elements may vary across different portions of the area of the first or second side of the cover element.

In one example, the pair of electrically conductive complementary elements is a first pair, and the moisture sensing and heating layer further includes one or more additional pairs of electrically conductive complementary elements. Here, each of the pairs is arranged along a different portion of the area of the first or second side of the cover element.

The sensor device may be a lidar sensor and in this case the one or more wavelengths may be between 890 nm-910 nm. The sensor device may be an image sensor and in this case the one or more wavelengths are in the optical frequency band.

According to another aspect of the technology, a vehicle is configured to operate in an autonomous driving mode. The vehicle comprises a control system having one or more processors configured to operate the vehicle in the autonomous driving mode based on objects and conditions in an environment external to the vehicle, and a perception system. The perception system is operatively coupled to the control system. The perception system is configured to detect one or more of the objects and conditions in the environment external to the vehicle. The perception system including the sensor assembly in any of the configurations described above, which is disposed along an exterior region of the vehicle. The distance between the pair of electrically conductive complementary elements may be selected according to an operating wavelength range of the sensor device.

According to a further aspect of the technology, a method of clearing moisture from a cover element of a sensor assembly is provided. The method comprises receiving, by a control module, moisture information obtained by a moisture sensing and heating layer disposed on a first or second side of the cover element of the sensor assembly, the moisture sensing and heating layer having a pair of electrically conductive complementary elements spaced apart a selected distance from one another, the pair of complementary elements covering an area of the first or second side of the cover element in a pattern and being transparent to operable wavelengths of a sensor in the sensor assembly; determining, by the control module based on the received moisture information, whether the moisture exceeds a threshold value; upon determining that the moisture exceeds the threshold value, the control module causing the pair of electrically conductive complementary elements to heat up to dissipate the moisture; and upon determining by the control module that the moisture falls below the threshold value, the control module causing the pair of complementary elements to cease heating.

The threshold value may be a fixed value or may be a variable stored in a lookup table. The threshold value may be determined based on a type of the sensor of the sensor assembly. The threshold value may be determined based on a location of the sensor assembly along a surface of a vehicle.

The method may further comprise receiving, by the control module, ambient information regarding one or more conditions external to the sensor assembly; and determining, by the control module, whether to preheat the pair of electrically conductive complementary elements based on the ambient information before the moisture exceeds the threshold value.

In an example, the method further comprises actuating a cleaning module to clean the cover element of the sensor assembly. Here, the cleaning module may be actuated upon determining whether the moisture exceeds the threshold value.

BRIEF DESCRIPTION OF THE DRAWINGS

FIGS. 5A-E illustrate aspects of condensation modules in accordance with aspects of the disclosure.

DETAILED DESCRIPTION

According to the technology, one or more optically transparent conductive film layers such as Indium Tin Oxide (ITO) acts as a time of wetness sensor element that covers the entire active optical area of interest. By way of example, the ITO layer or other transparent conductive film may be lithographically applied to a glass sensor cover or other window, with interleaved sections or "combs" of material that are spaced closely enough to detect a minimum amount of condensate. Resistivity or capacitance of the transparent conductive film may be measured continuously, at regular time intervals, or based on environmental or driving conditions.

When the measured value of the resistivity of the ITO layer drops below a threshold that indicates the presence of condensate, power is applied to each half of the interleaved ITO comb to effectively turn each half of the structure into a heater. When the resistivity rises above the condensate threshold, power may be removed from the comb structure. Through this dual operation condensate detector and heater arrangement, the time of wetness sensor module may only activate when condensate is present, rather than being powered whether or not condensate is present. In one scenario, the threshold is tunable based on the spacing of the ITO layer and the substrate material. In this case, a secondary coating/layer may be added to in order to improve measurement accuracy.

This architecture enables the system to be employed in sensor assemblies at various locations along a self-driving vehicle. It is also usable with sensor units having active optical areas with different form factors. While the technology is particularly beneficial to vehicles operating in an autonomous driving mode, it can also be applied to other sensor systems and arrangements that can be used in environmental conditions subject to condensation issues.

Example Vehicle Systems

Figure 1A:
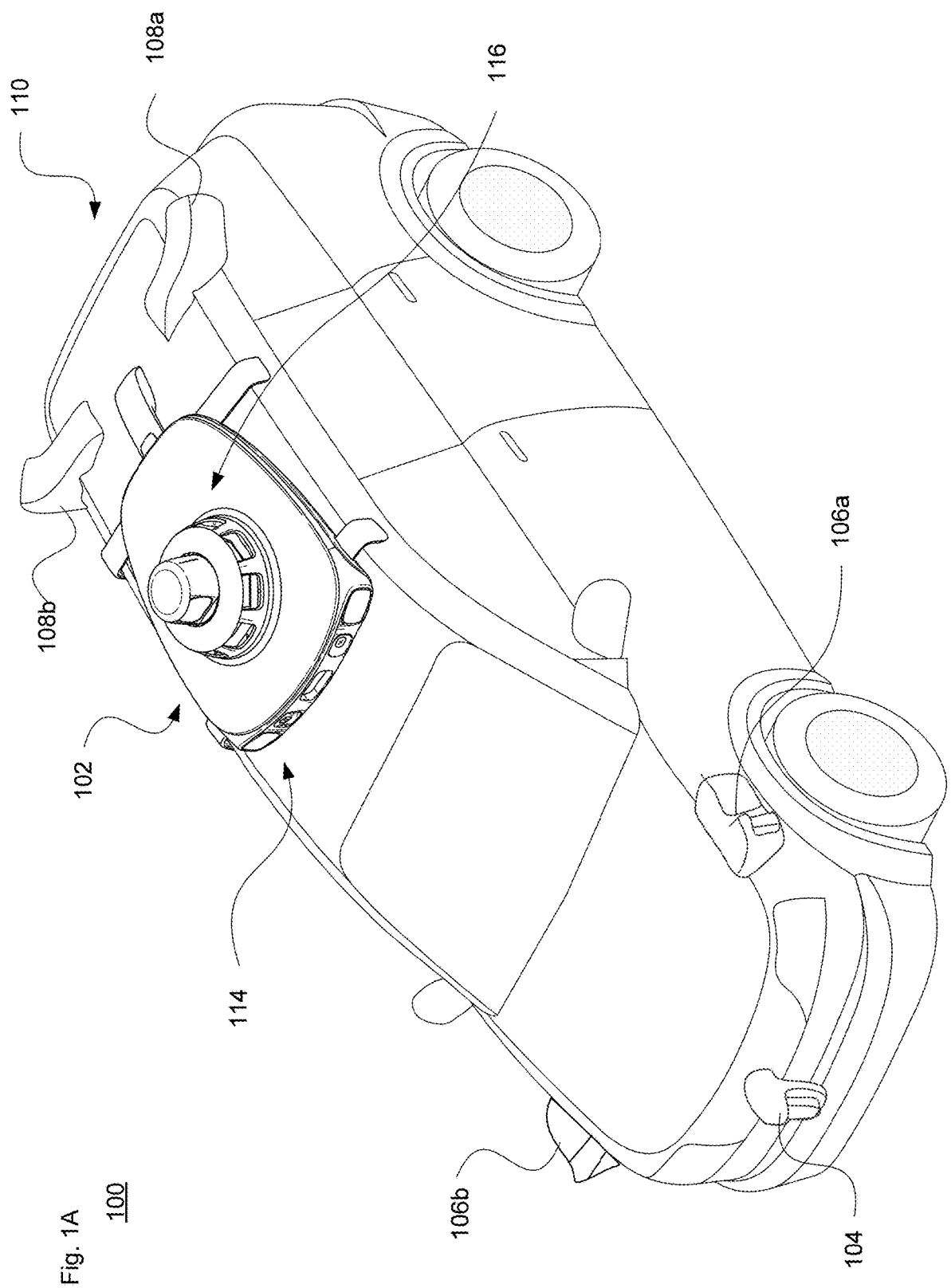
FIGS. 1A-C illustrate example self-driving vehicles in accordance with aspects of the technology.
Figure 1B:
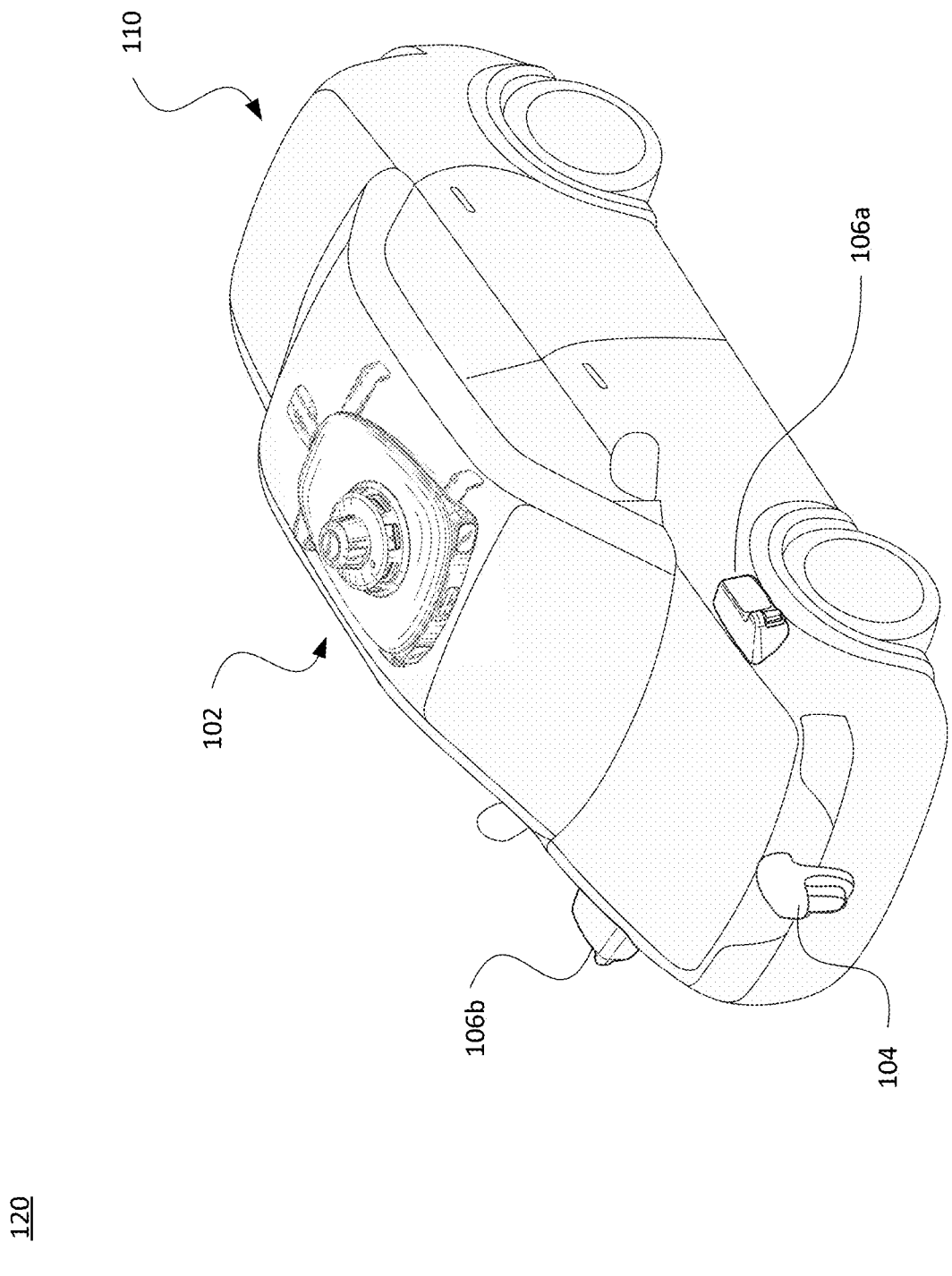
Figure 1C:
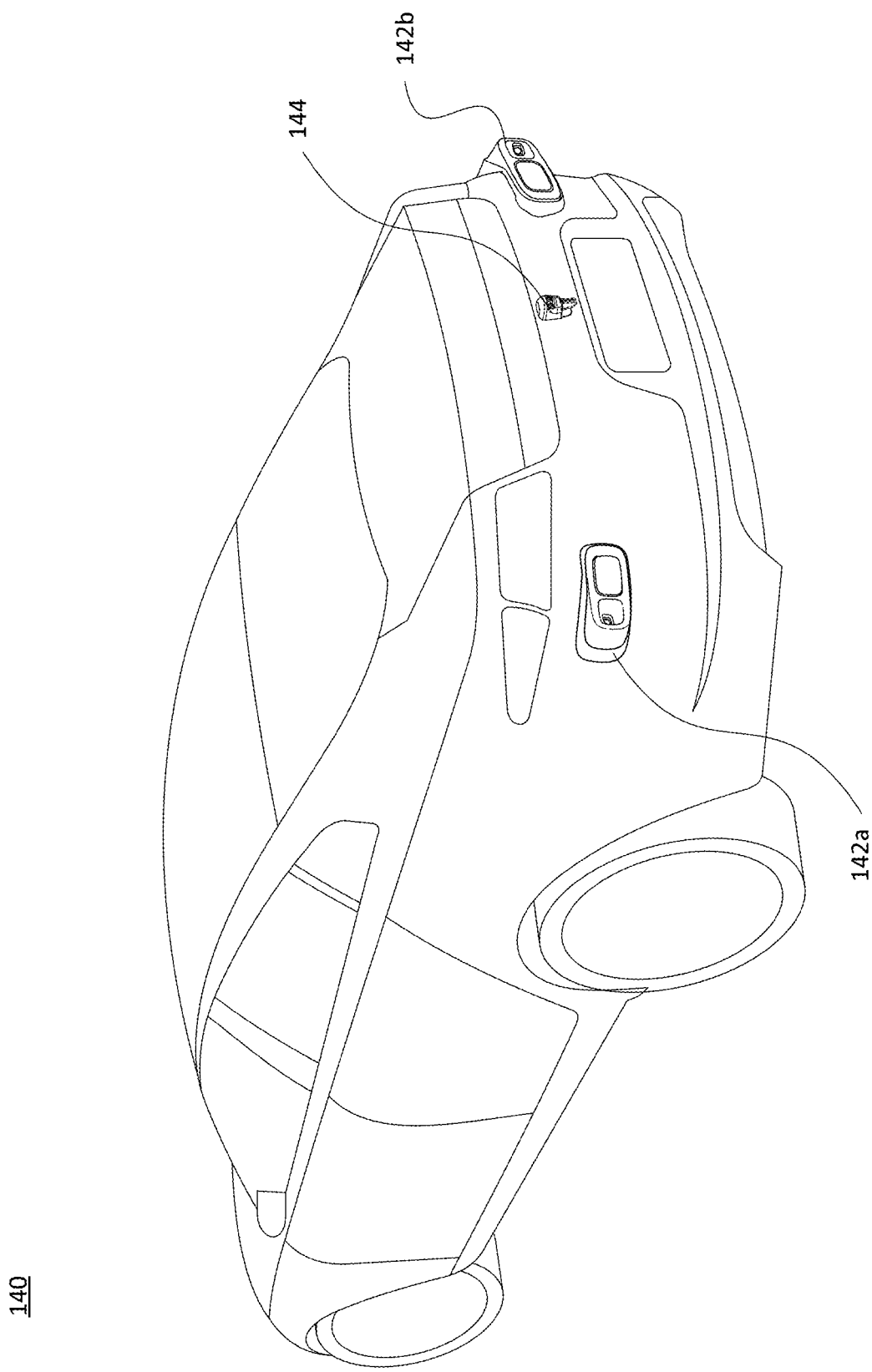

FIG. 1A illustrates a perspective view of an example passenger vehicle 100, such as a minivan or sport utility vehicle (SUV). FIG. 1B illustrates a perspective view of another example passenger vehicle 120, such as a sedan. And FIG. 1C illustrates a rear perspective view of another example passenger vehicle 140.

Such passenger vehicles may include various sensors for obtaining information about the vehicle's external environment. For instance, a roof-top housing unit (roof pod assembly) 102 may include a lidar sensor as well as various cameras (e.g., optical or infrared image sensors), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. This can be seen in FIG. 1C, where sensor housings 142a and 142b are arranged along the left and right sides of the bumper, while the assembly of sensor housing 144 is disposed centrally at the rear of the vehicle.

Arrow 114 in FIG. 1A indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 120 of FIG. 1B (e.g., a sedan). By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

Figure 1D:
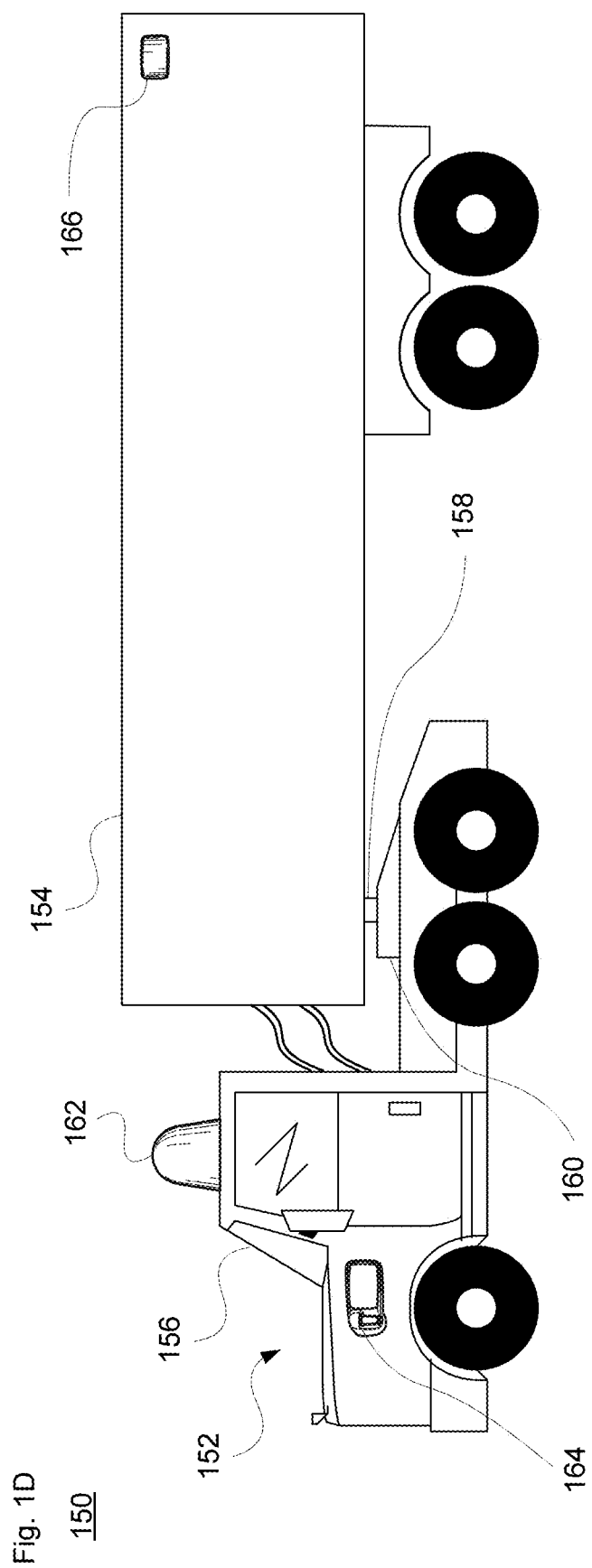
FIGS. 1D-E illustrate example cargo-type vehicles configured for use with aspects of the technology.
Figure 1E:
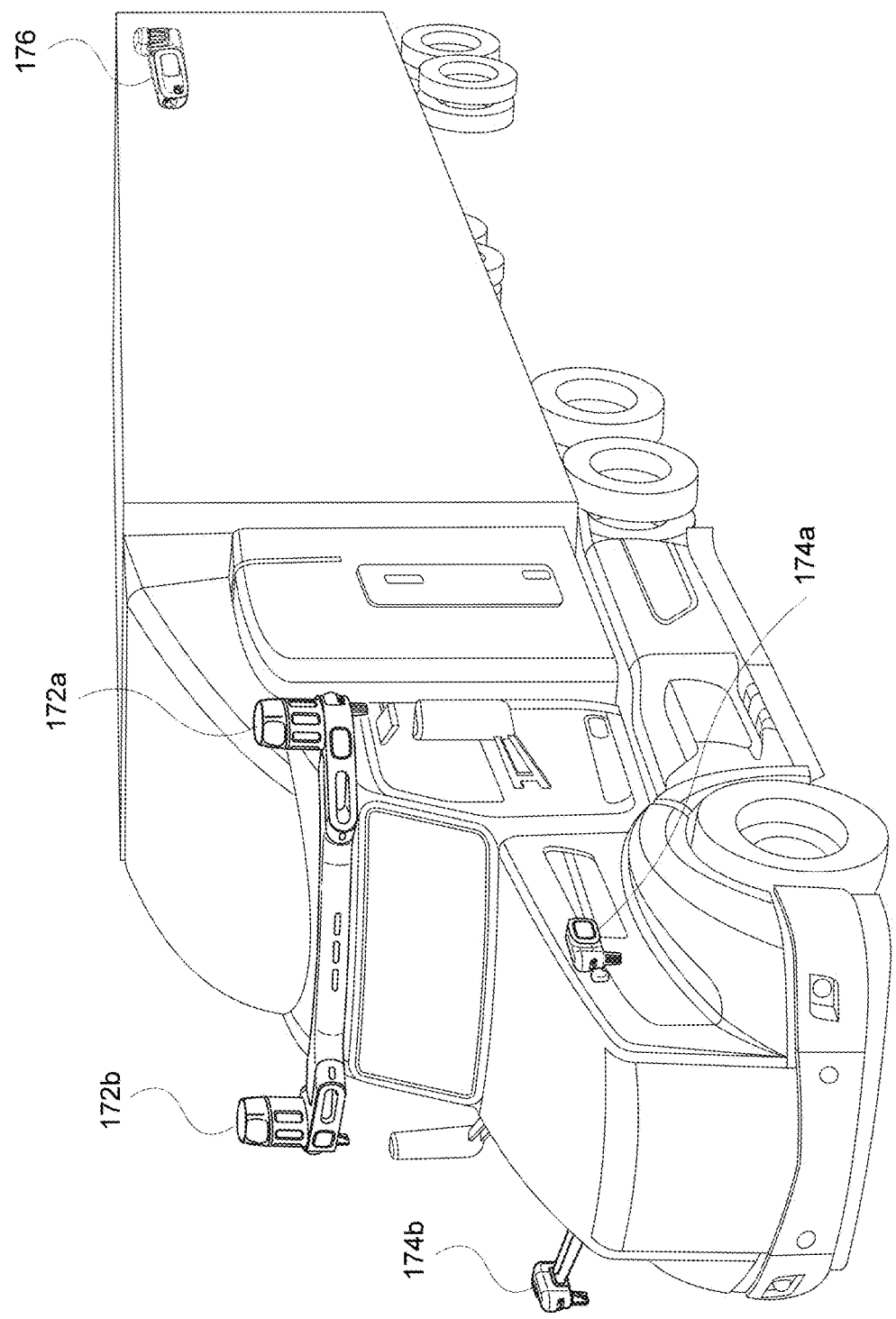

FIGS. 1D and 1E illustrate example cargo vehicles 150 and 170, respectively, such as tractor-trailer trucks. A given cargo vehicle may include, e.g., a single, double or triple trailer, or may be another medium or heavy duty truck such as in commercial weight classes 4 through 8. As shown in FIG. 1D, this truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154. Similarly, along the example truck 170 of FIG. 1E, the tractor may have a distributed set of sensor units 172a,b disposed on a roof or top portion of the cab, and side sensor units 174a,b disposed on left and/or right sides of the cab. In this example, the trailer may also have one or more sensor units 176 disposed therealong, for instance along a side panel as shown.

As with the sensor units of the passenger vehicle of FIGS. 1A-B, each sensor unit of the cargo vehicle or the articulating vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be different types of vehicle including, but not limited to, cars, motorcycles, cargo vehicles, buses, recreational vehicles, emergency vehicles, construction equipment, etc. Furthermore, certain types of sensors (e.g., lidars or cameras operating at infrared or optical wavelengths), can be adversely affected if the window or other cover that is transparent at the desired wavelength(s) has condensation on it. In particular, obtained sensor data may be degraded as a result of condensation. In turn, this could impact how a vehicle operates in an autonomous driving mode when it is reliant on such sensor data.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions or situations. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
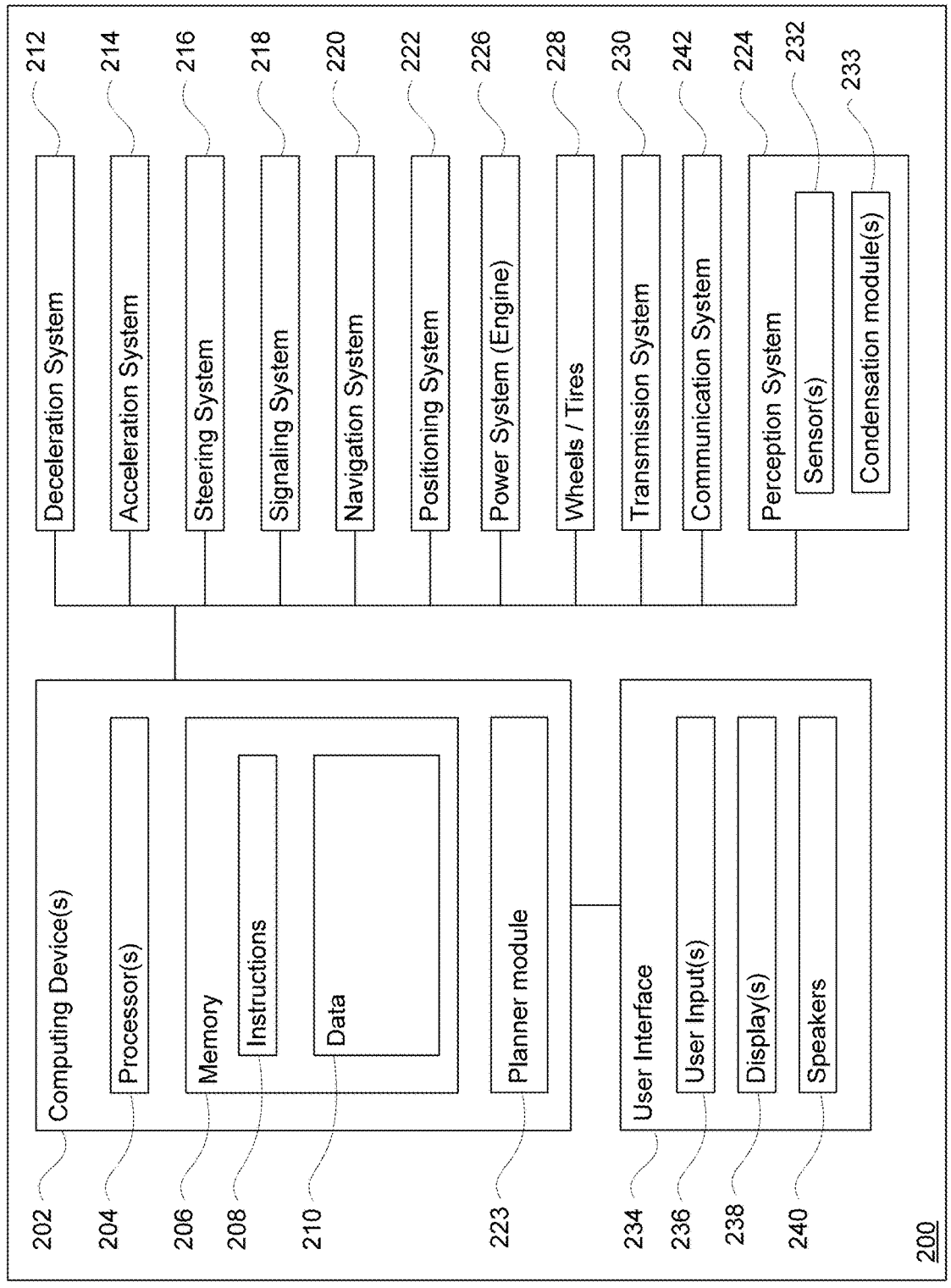
FIG. 2 illustrates components of a self-driving vehicle in accordance with aspects of the technology.

FIG. 2 illustrates a block diagram 200 with various components and systems of an exemplary vehicle, such as passenger vehicles 100, 120 and 140, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. For instance, the memory may include one or more models to perform self-reflection filtering, including one or more models of the vehicle. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics, detected sensor data and/or condensation-related information, which may be on board the vehicle or remote, depending on the implementation.

The processors 204 may be any conventional processors, such as commercially available CPUs or GPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects and conditions in the vehicle's surrounding environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously in either a partial or fully autonomous driving mode.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway. By way of example only, the perception system 224 may include lidar sensors, radar units, cameras (e.g., optical imaging devices, with or without a neutral-density filter (ND) filter), one or more microphones or other acoustical arrays, positioning sensors (e.g., gyroscopes, accelerometers and/or other inertial components), infrared sensors, and/or any other detection devices that record data which may be processed by computing devices 202.

Such sensors of the perception system 224 may detect objects in the environment outside of the vehicle and their characteristics such as location, orientation relative to the roadway or relative to the vehicle, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 212, and other factors associated with the equipment of the vehicle itself.

As illustrated in FIGS. 1A-E, certain sensors of the perception system 224 may be incorporated into one or more sensor assemblies or housings. In some examples, these may be integrated into front, rear or side perimeter sensor assemblies around the vehicle (e.g., units 104 and 106). In another example, other sensors may be part of the roof-top housing (roof pod) 102. The computing devices 202 may communicate with the sensor assemblies located on or otherwise distributed along the vehicle. Each assembly may have one or more types of sensors such as those described above.

The raw data obtained by the sensors, as well as information about the sensors themselves, can be processed by the perception system 224 (such as via a processing chip of the sensor or incorporated into a sensor assembly module) and/or sent for further processing to the computing devices 202 periodically or continuously as the data is generated by the perception system 224. A subsystem having one or more condensation modules 233 may be integrated into the perception system 224. By way of example, each condensation module 233 may be associated with one particular sensor (e.g., a lidar sensor or camera) or a group of sensor assemblies that share a common window or transparent cover (e.g., any of the units 102-108 of FIGS. 1A-B, 142-144 of FIG. 1C, 162-166 of FIG. 1D and/or 172-176 of FIG. 1E). Each condensation module 233 is able to operate as a detector to sense the presence of moisture and as a heater to remove the moisture/condensation from a transparent cover or other window of the sensor. Ambient sensor information, including information about precipitation, fog, ambient temperature, dew point, etc., may be used to operate the condensation modules 233.

Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform validation or calibration of individual sensors, all sensors in a particular sensor assembly, or between sensors in different sensor assemblies or other physical housings.

Computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
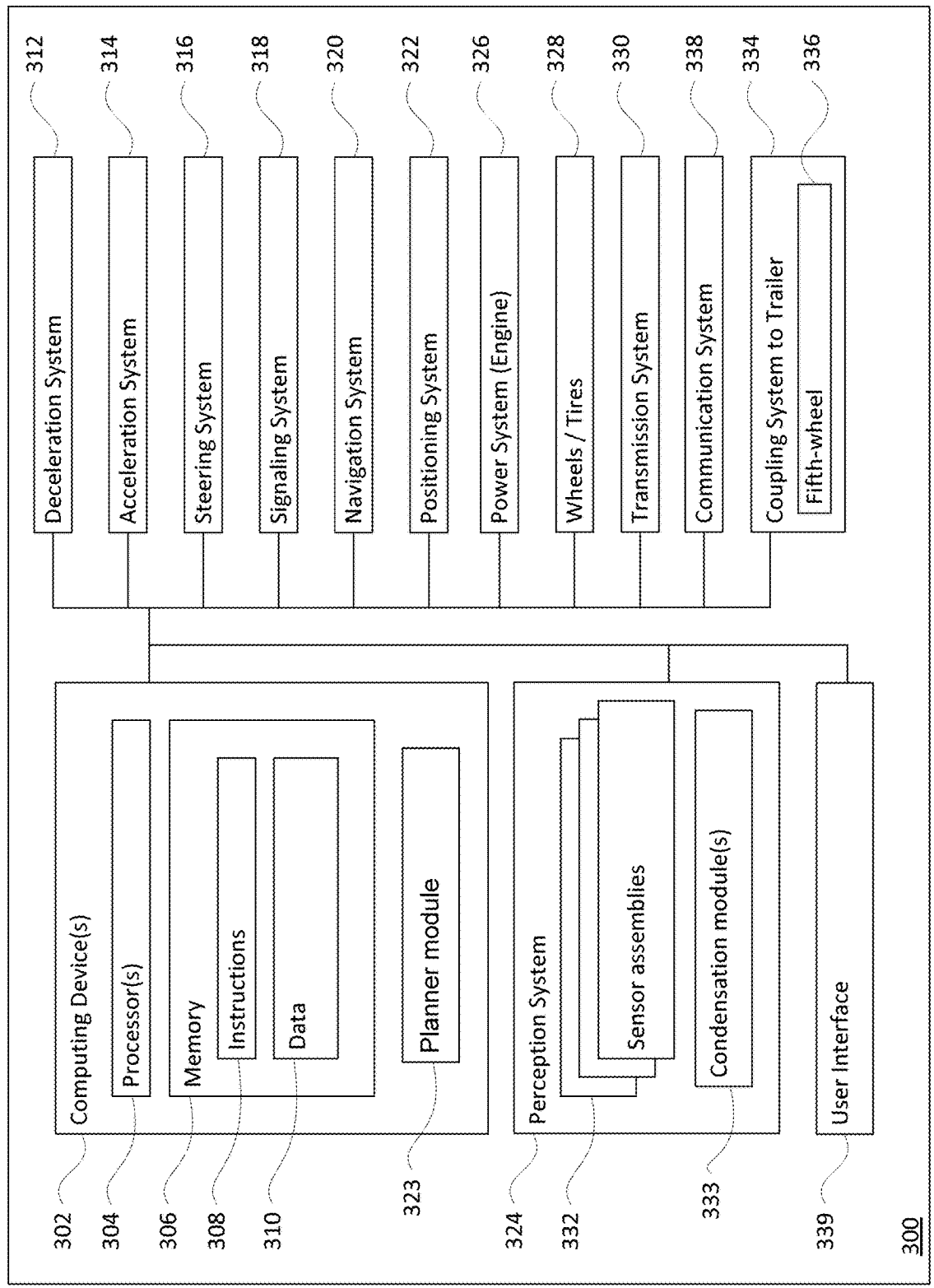
FIGS. 3A-B are block diagrams of systems of an example cargo-type vehicle in accordance with aspects of the technology.

FIG. 3A illustrates a block diagram 300 with various components and systems of a large vehicle, e.g., vehicle 150 or 170 of FIGS. 1D-E. By way of example, the vehicle may be a truck or bus, farm, emergency or construction equipment, or the like, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150 or vehicle 170. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 328 are coupled to the transmission system 330, and the computing devices 302 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers, e.g., integrated into the side-view mirrors or extending along the cab roof on the truck, farm equipment, construction equipment or the like. Sensor assemblies 332 may also be positioned at different locations on the tractor unit 152 or on the trailer 154, as noted above with regard to FIGS. 1E-F. The computing devices 302 may communicate with the sensor assemblies located on both the tractor unit and the trailer, or along the front and rear portions of the large vehicle. Each assembly may have one or more types of sensors such as those described above.

As noted above with regard to FIG. 2, the raw data obtained by the sensors, as well as information about the sensors themselves, can be processed by the perception system (such as via a processing chip of the sensor or incorporated into a sensor assembly module) and/or sent for further processing to the computing devices periodically or continuously as the data is generated by the perception system. Similarly, a subsystem having one or more condensation modules 333 may be integrated into the perception system 324 and operate in the same way.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck, bus or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
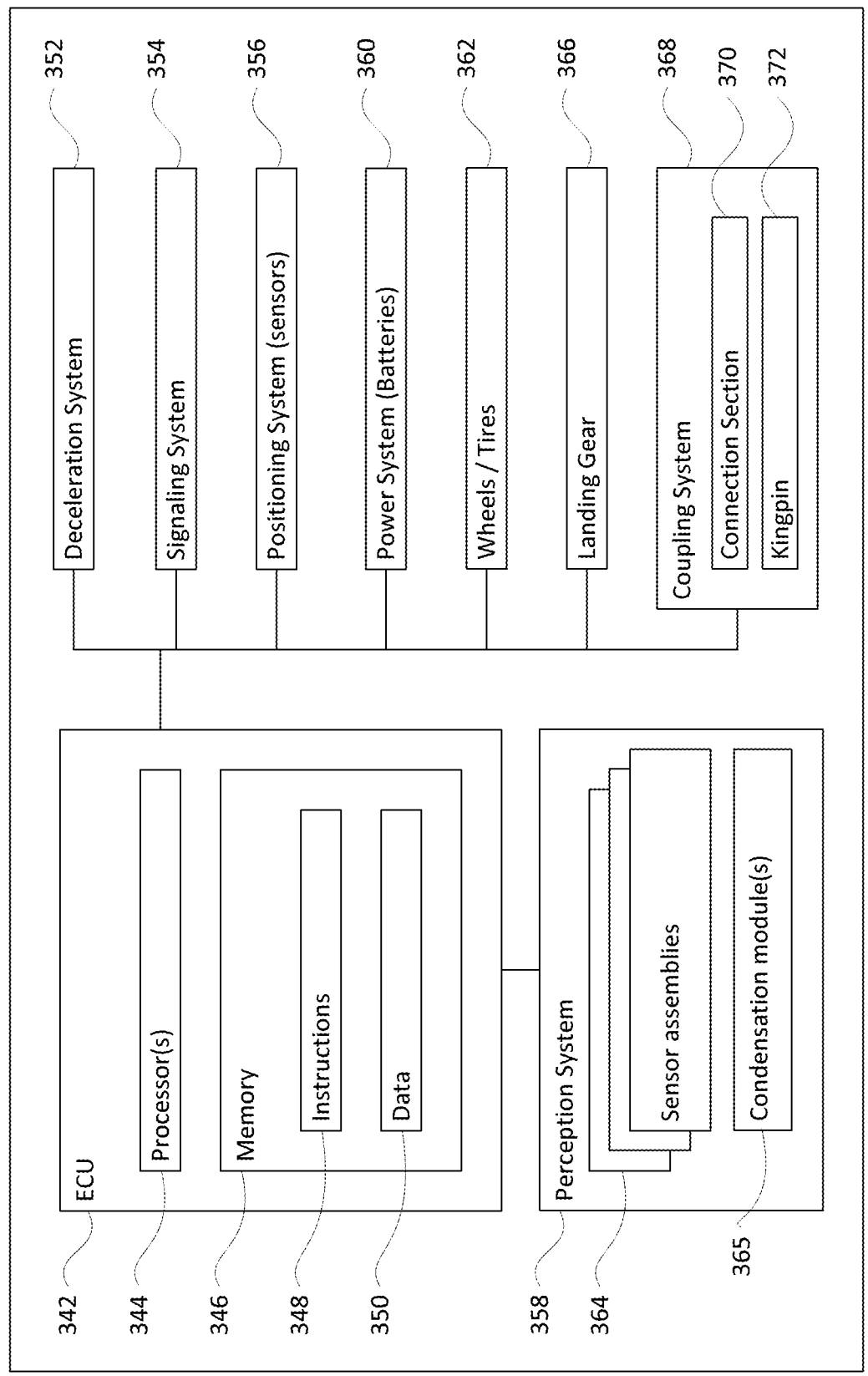

FIG. 3B illustrates an example block diagram 340 of systems of a trailer unit, such as trailer 154 of FIG. 1D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. A subsystem 365 having one or more condensation modules may be integrated into the perception system 358 and may function as discussed above.

The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

Example Implementations

In view of the structures and configurations described above and illustrated in the figures, various aspects will now be described in accordance with aspects of the technology.

As noted above, various sensors may be located at different places around the vehicle to gather data from different parts of the external environment and/or the vehicle itself. Certain sensors may have different fields of view (FOV) of the external environment and/or parts of the vehicle depending on their placement around the vehicle and the type of information they are designed to gather. For instance, different lidar sensors may be used for near (short range) detection of objects adjacent to the vehicle (e.g., with a range of less than 2-meters), while others may be used for far (long range) detection of objects a hundred meters (or more or less) in front of the vehicle. Mid-range lidars may also be employed (e.g., a range between 5-150 meters). Multiple radar units may be positioned toward the front or rear of the vehicle for long-range object detection as well as on the sides of the vehicle for perimeter detection of adjacent objects. And cameras may also be arranged in various locations to provide good visibility around the vehicle, including for close-in sensing adjacent to the vehicle.

Depending on the configuration, a set of sensors may be arranged within one housing or distributed in an arrangement around the vehicle to include multiple individual sensors with overlapping fields of view. Alternatively or additionally, other sensors may provide redundant 360° fields of view. In addition to detecting objects in the environment external to the vehicle, these sensors may be used to determine the vehicle's actual pose along a roadway including, e.g., the orientation of the trailer with respect to the tractor unit of a cargo vehicle, or the respective orientations of the front and rear of an articulated bus. This can include orientation information about the state of different sections of the vehicle (e.g., tractor or trailer, front or rear of bus, etc.) in terms of position, roll, pitch, yaw, and associated time derivatives of such state information.

Figure 4A:
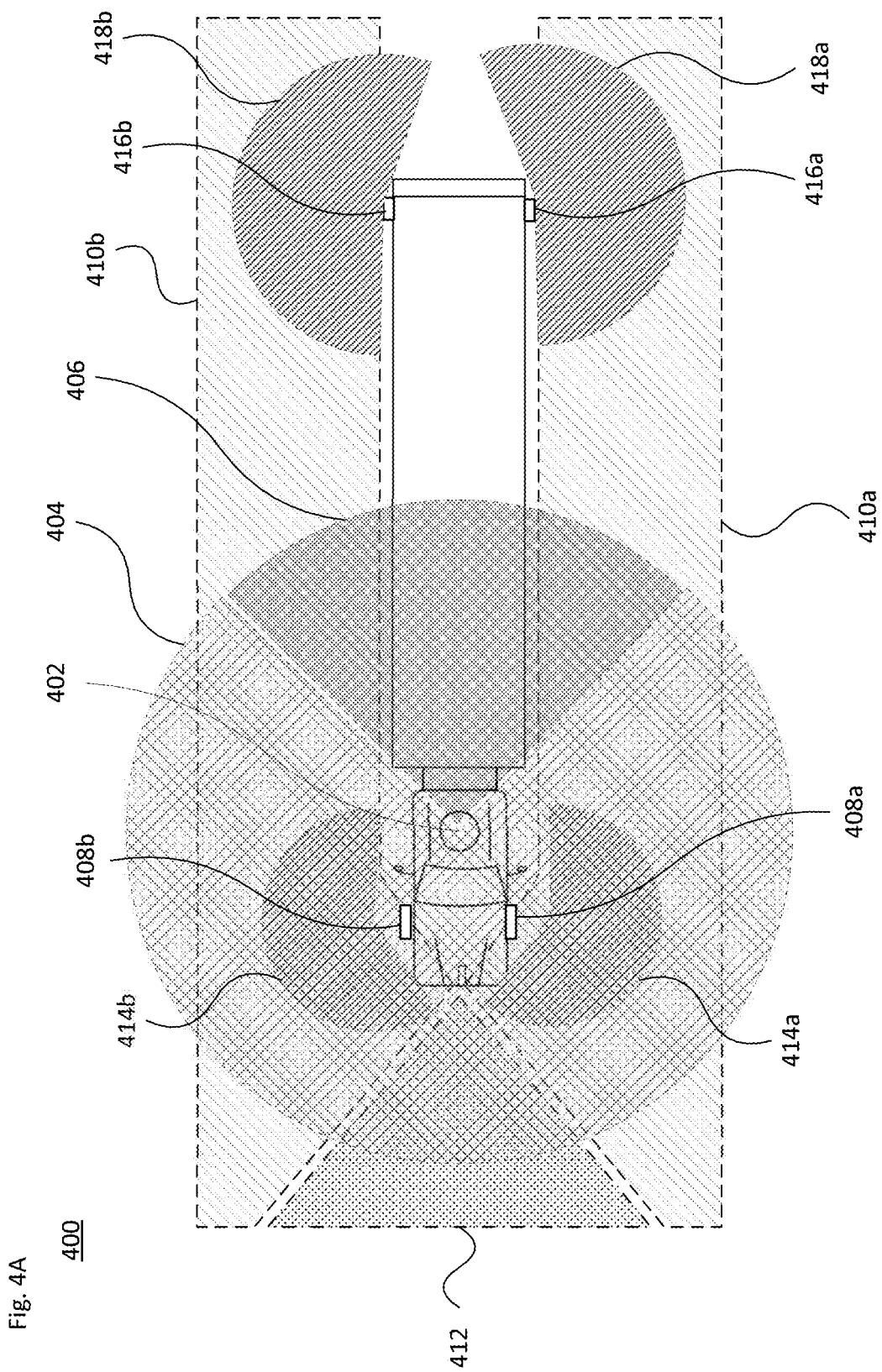
FIGS. 4A-D illustrates example sensor fields of view and signals in accordance with aspects of the disclosure.

FIG. 4A provides one example 400 of sensor fields of view relating to the sensors, such as those illustrated in FIGS. 1C-D. As illustrated in this example, the lidar(s) in roof pod assembly 402 may have a FOV 404, such as a 360° FOV. Here, as shown by darker region 406, the trailer or other articulating portion of the vehicle may provide signal returns including self-returns, and may partially or fully block a rearward view of the external environment. Long range lidars of left and right side sensor units 408a, 408b of the tractor unit have corresponding FOVs 410a and 410b. These can encompass significant areas adjacent to and along the sides and front of the vehicle. As shown, there may be an overlap region 412 of the fields of view of these various sensors in front of the vehicle. The overlap region 412 may provide the perception system with additional or information about a very important region that is directly in front of the tractor unit. This redundancy also has a safety aspect. Should one of the long range lidar sensors suffer degradation in performance, the redundancy would still allow for operation in an autonomous mode. Short range lidars of the sensor units 408a and 408b have smaller FOVs 414a and 414b, for instance as part of a close-in sensing system to detect objects immediately adjacent to the front portion (e.g., tractor) of the vehicle. Both the long range and short range lidars may be co-located in a single housing 408a or 408b as shown, or may be disposed separately on the vehicle. In addition, left and right side sensor units 416a and 416b may be located along the rear of the vehicle, such as the trailer. Here, these sensor units have corresponding FOVs 418a and 418b, for instance as part of the close-in sensing system to detect objects immediately adjacent to the rear portion (e.g., trailer) of the vehicle. Spacing is shown between different fields of view for clarity in the drawing; however, in actuality there may be no break in the coverage. The specific placements of the sensor assemblies and fields of view is merely exemplary, and may be different depending on, e.g., the type of vehicle, the size of the vehicle, FOV requirements, etc.

Figure 4B:
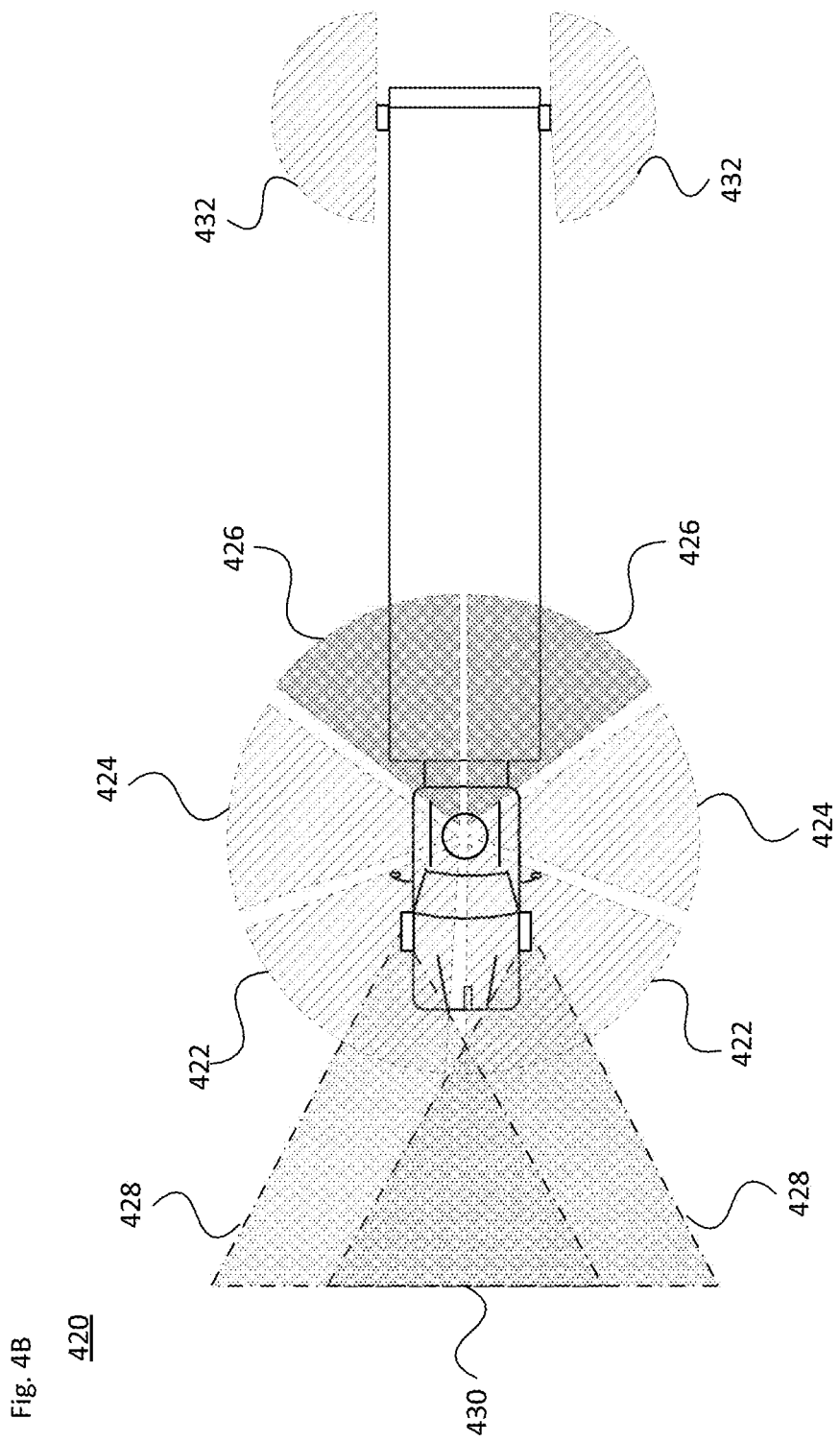

FIG. 4B illustrates an example configuration 420 for either (or both) of radar and camera sensors in a rooftop housing and on both sides of a tractor-trailer vehicle. Here, there may be multiple radar and/or camera sensors in each of the sensor housings 402, 408 and/or 416. As shown, there may be sensors in the rooftop housing with front fields of view 422, side fields of view 424 and rear fields of view 426.

As with region 406, the trailer may impact the ability of the sensors with FOVs 426 to detect objects behind the vehicle, e.g., due to self-reflection of certain signals. Sensors in the side sensor assemblies 408 may have forward facing fields of view 428 (and side and/or rear fields of view as well). And sensors in the rear perimeter assemblies 416 may have side and rearward facing FOVs 432. As with the lidars discussed above with respect to FIG. 4A, the sensors of FIG. 4B may be arranged so that the adjoining fields of view overlap, such as shown by overlapping region 430. The overlap regions here similarly can provide redundancy and enhanced resolution, and have the same benefits should one sensor suffer degradation in performance.

These sensors are employed to gather information about the external environment around the vehicle, including other objects, road conditions, weather conditions, etc. Sensor information can also be used to obtain pose and other information about the vehicle itself, such as an accurate trailer position relative to the tractor. The on-board control system may be able to use the received sensor information and a kinematic model of the vehicle in conjunction with geographic data (e.g., maps) to plan routes or select trajectories that are optimized for vehicle maneuvering.

Figure 4C:
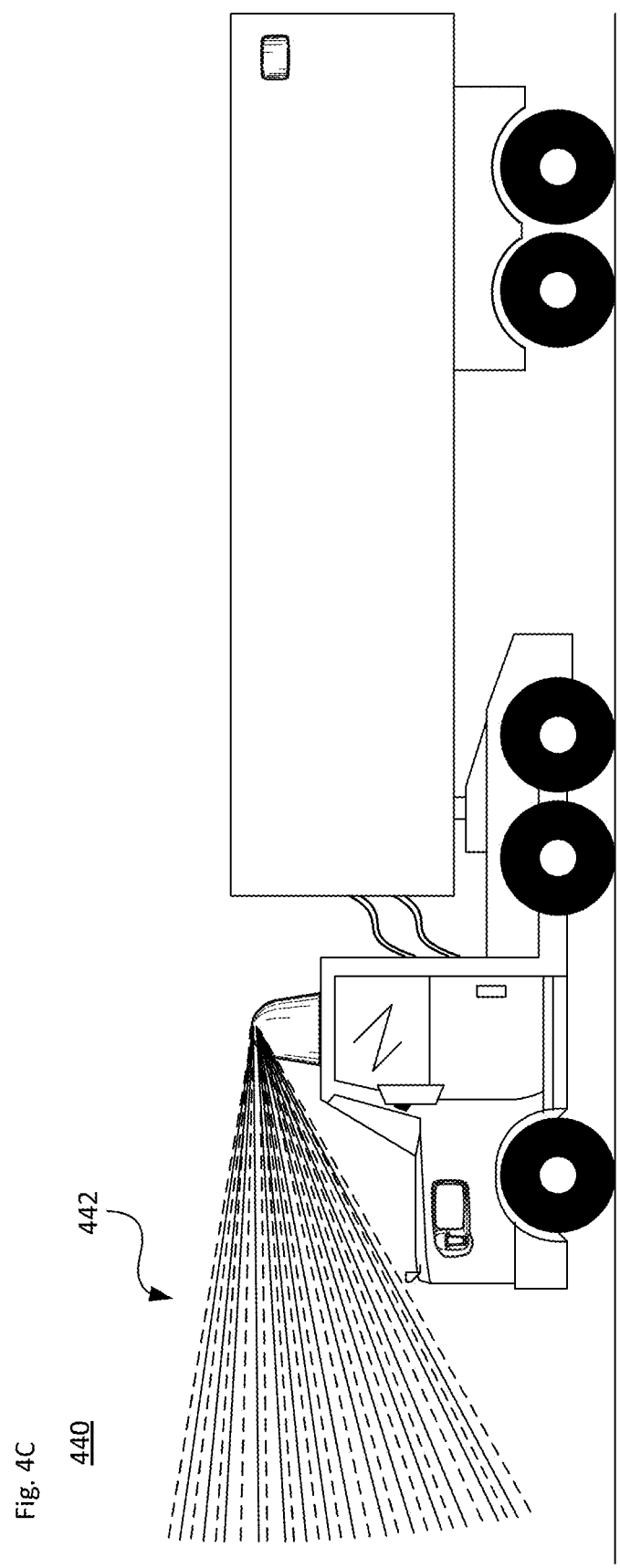

These and other sensors can detect not only the location of objects in the environment, but also their height and other information as well. This may be done by making multiple scans of the environment by one or more sensors. By way of example, illustration 440 of FIG. 4C shows a vehicle using a sensor assembly to scan for objects in the environment. The sensor assembly may be, e.g., rooftop sensor assembly, a front, side or rear perimeter sensor assembly, etc. The sensor assembly may include one or more lidar, radar, camera or other sensors therein. In the scenario of FIG. 4C, solid and dashed lines 442 emanating from the housing indicate examples of individual scans of the environment. For instance, 10 (or more or less) individual scans may be made by a given sensor per scan period. This may include adjusting the sensor's FOV up or down, left or right, e.g., with a motor, servo or other actuator. The individual scans may be selected to cover particular portions of the sensor's FOV or selected regions around the vehicle. Illustration 460 of FIG. 4D, discussed further below, shows that some of the scans (e.g., dotted lines 476) may generate one or more return signals from objects in the vehicle's environment (e.g., dash-dot lines 478).

Raw return signals from lidar scans form a point cloud of information about the external environment. Based on this information, the on-board control system (e.g., computing devices 202 or 302) may detect objects of different size, shape and height, such as passenger vehicles, bicycles, streetlights and street signs, foliage, curbs, etc. However, the presence of precipitation, condensation or moisture generally along a surface of a window that is being "looked-through" by a given sensor can adversely affect emitted and returned signals, which can provide an incorrect representation about the external environment.

Figure 4D:
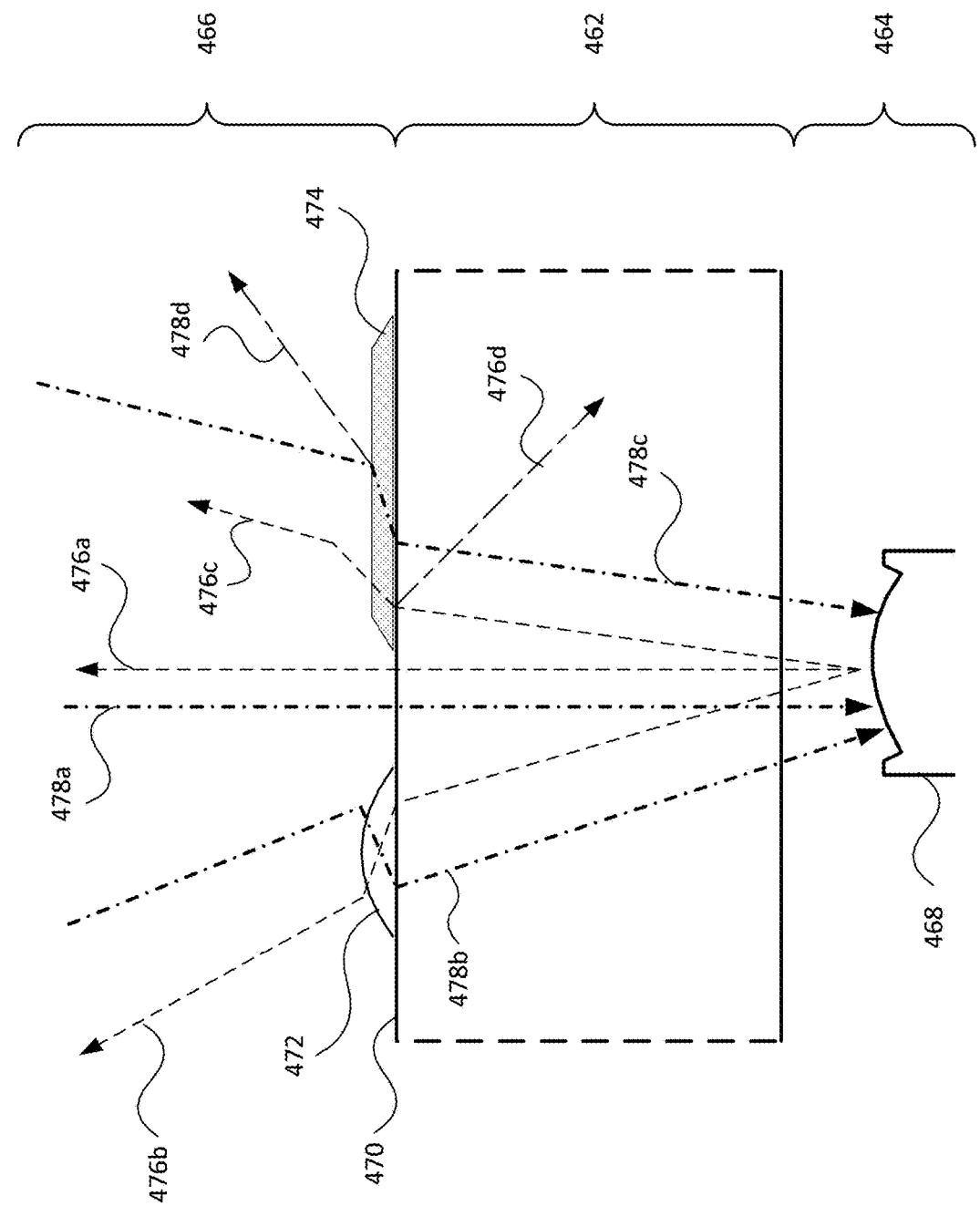

For instance, as shown in example 460 of FIG. 4D, a window or other cover element 462 of, e.g., glass, is disposed between a sensor area 464 and the external environment 466. Other materials may be used as the cover element, such as polycarbonate, sapphire, and even silicon. In this example, a sensor 468, such as a lidar sensor, is disposed in the sensor area 464. The sensor 468 is configured to emit laser light at one or more selected frequencies. The sensor 468 may be stationary or able to rotate, either relative to the cover element 462 or in conjunction with rotation of the cover element 462. The cover element 462 is transparent to the frequencies emitted and/or received by the sensor 468.

As an example, water molecules may condense on the outer surface 470 of the cover element 464. This can include, e.g., a water droplet 472 and/or ice crystals 474. Such objects may adversely affect emitted or received signals. By way of example, as seen by the dashed lines 476, emitted beams from the sensor may pass through the cover element 462 unimpeded (e.g., 476a), may be refracted by water droplet 472 or another liquid or solid (e.g., 476b and 476c), or may be partially or fully blocked (or reflected) by ice crystals 474 (e.g., elongated dash dot line 476d). Similarly, as seen by the dash-dot lines 478, received beams may pass through the cover element 462 unimpeded to the sensor (e.g., 478a), may be refracted by water droplet 472 or ice crystals 474 (e.g., 478b and 478c), or may be partially or fully blocked (or reflected) by the precipitation (e.g., elongated dash dot line 478d).

In order to identify the presence of precipitation, condensate or fog (collectively referred to herein as moisture) on either the outer or inner surface of the cover element or other sensor window, a specialized time of wetness sensor is provided which includes a transparent film that is arranged to cover the active optical area of interest. As noted above, the transparent film may be an ITO layer having two (or more) interleaved combs of material. And in order to remove the moisture from the outer or inner surface, the interleaved combs are also able to operate as heating elements. The comb halves are spaced a selected distance from one another to enable both the sensing of moisture and effectively heating the region of interest to remove the moisture. The distance between interleaved sections is dependent on the sensitivity level desired in the system. For instance, closer proximity will enable smaller moisture measurements, but may be more susceptible to noise, while a larger gap may only be able to detect larger droplets. Thus, in one example the order of magnitude of the spacing is on the order of 0.1 mm (e.g., +/−10%).

Figure 5A:
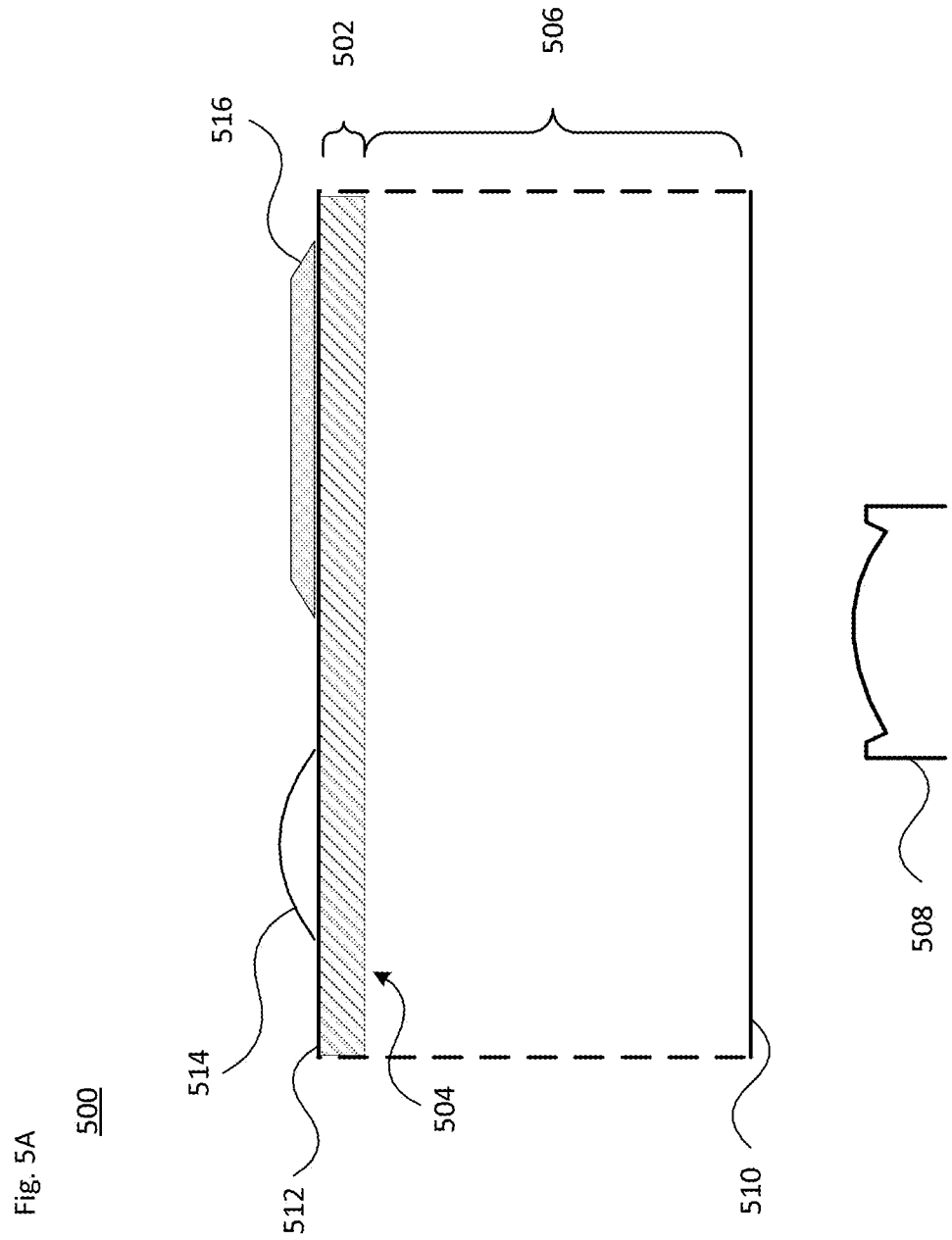
Figure 5B:
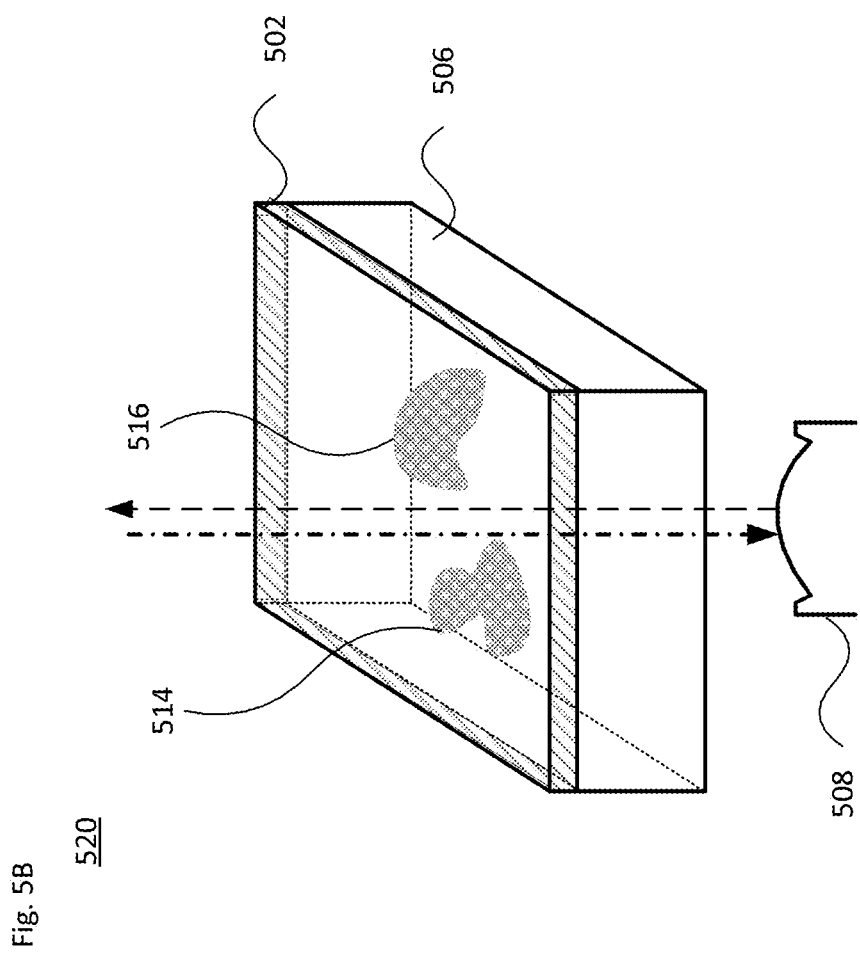

FIGS. 5A and 5B illustrate side and perspective views of one example of a moisture sensing and heating arrangement. In the side view 500 of FIG. 5A and the perspective view 520 of FIG. 5B, layer 502 of a condensation module is arranged on surface 504 of window 506 of the cover element for a sensor unit. As shown, sensor 508 is disposed beneath the cover element facing surface 510 of the window 506. The sensor 508 is configured to emit and/or receive signals at one or more selected wavelengths (e.g., optical, near infrared, etc.) through the window 506 (e.g., glass or other transparent layer such as a plastic) and layer 502. As shown in this example, objects may be on outer surface 512 of the layer 502, e.g., precipitation such as a water droplet 514 and/or ice crystals 516.

FIG. 5C illustrates a top-down view 540 of a portion of the layer 502 as shown by the dashed rectangular area. Even though this layer is optically transparent (at least for the wavelengths used by the underlying sensor), this figure provides an example of a pair of interleaved comb or otherwise complementary patterned elements 542a (shown in solid lines) and 542b (shown in dotted lines). In one example, the elements 542 comprise ITO, for instance formed lithographically on a glass window. The physical properties of the ITO and substrate material (including an optional coating between the sections of ITO, e.g., to enhance conductivity or to promote even heating) can affect the electrical properties of the system and may be optimized for the specific sensor element to detect a specific size condensate within a specific power budget of the system.

Figure 5D:
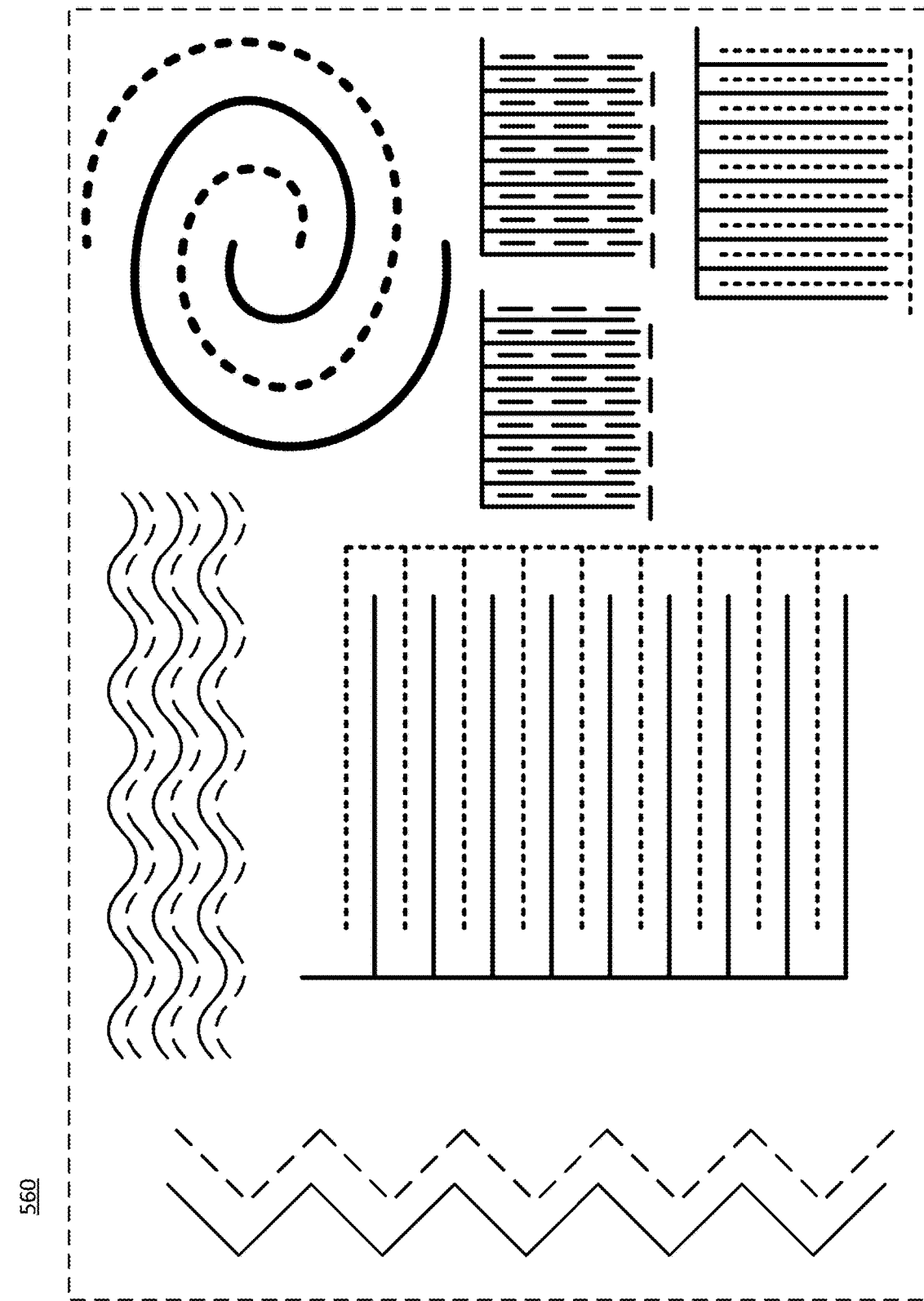

While these elements 542 are shown as series of parallel rows in the example of FIG. 5C, they may be patterned in other complementary shapes, such as angular, wavy, arcuate, triangular, circular, etc. FIG. 5D illustrates a view 600 of a window portion where different interleaved elements have different patterns, with different spacing between the comb pairs. The exact shape of each element is not critical; rather, it is sufficient that the opposing element pair(s) components are spaced close enough to one another in order to detect moisture on the surface of the sensor covering, and to heat up to dissipate the moisture to obtain an optically clear viewing window. The spacing and/or geometry between the comb elements may vary along different regions of the window. This may be done to ensure rapid detection of condensation and/or highly efficient heating to remove the condensation. For instance, the spacing/geometry may be selected depending on the size of the condensate to be detected.

The elements 542 are electrically conductive and act as both inductive and resistive elements, depending on whether moisture is being detected or whether acting as heating elements. According to one aspect of the technology, during operation heating power can be applied to the system, while measuring the resistance or capacitance between the ITO layers simultaneously, so that heating power only needs to be applied when condensate is measured. The system may operate with either DC or AC, or both. In a DC heating embodiment, each half of the ITO requires its own power and ground, while in an AC embodiment, one half of the ITO would be ground, while the other was powered with AC voltage. Returning to FIG. 5C, as shown one end 544a or 544b of each element 542 acts as a contact or node that leads off of the layer 502. FIG. 5E illustrates a view 580 of a condensation sensor and heater system, in which leads 582a and 582b are connected to a corresponding contact/node 544. The leads 582a and 582b are connected to a control module 584. Should there be multiple sets or pairs of comb elements along a given sensor window, they may all be operatively coupled to the same control module 584.

The control module 584 includes a controller, processor, ASIC, FPGA or other circuitry that receives signals from the comb elements via the leads 582 and compares the received signals to a condensation threshold, which may be a hard-coded value or a variable that is, e.g., stored in a lookup table. In particular, the resistivity or capacitance between the ITO combs is indicative of the amount of moisture/condensation that is present on the outer surface of the window. In one example, the lookup table may also include information about ambient temperatures, dew points, wind speed, wind direction and/or other ambient environmental factors. Alternatively or additionally, the location of the sensor assembly along the vehicle (e.g., front fender, rear fender, side quarterpanel or roof), as well as the pitch or angle of the sensor window (e.g., angled downward 5-20° for a close-in sensing device versus generally perpendicular to the roadway surface) may also impact the condensation. For instance, humidity information taken by a sensor along the vehicle roof (or received from a remote weather data source not at the vehicle) may not be accurate for a sensor along the front or rear bumper, which is closer to the ground and which may be affected differently by the wind as the vehicle drives. So localized data associated with different sensor assemblies may be beneficial for the condensation analysis. Some or all of this information may be evaluated by the control module to determine whether the condensation threshold has been exceeded. If so, the control module causes the comb elements to act as heaters, for instance by causing current to flow into the ITO combs at a selected rate and based on the resistance/impedance of the combs. Here, wiring (not shown) may also be connected between the control module and an opposing end of each comb opposite the node 544 to complete a heating element circuit. It may not be necessary to regulate the temperature of the heating process, because the driving factor may be reducing the condensation below a selected threshold (e.g., below 5-10% of the total surface area of the window, or until the measured impedance is below X ohms). However, the amount of power used may be controlled to avoid raising the temperature of the ITO elements above an operating threshold.

While heating is occurring, the amount of condensation may continue to be measured by the module. This can be done during heating, or during short periods (e.g., 2-10 seconds when the heating is turned off. Thus, through this combined condensate detector and heater assembly (e.g., of condensation module 233 in FIG. 2, 333 in FIG. 3A, or 365 in FIG. 3B), heating is activated only when condensate is present, rather than turning on whether or not condensate is present. This saves power and may extend the operational life of the system. The control module 584 of the assembly may be located adjacent to the sensor window, such as integrated into the housing of the sensor assembly, or may be located separate or otherwise remote from the sensor assembly. Thus, in the latter case, the control module 584 may be able to manage condensation mitigation for multiple sensor windows, which may be distributed around the vehicle. In one scenario, the system may begin to heat in advance of reaching the condensation threshold, if the ambient information indicates that there is a high likelihood that the sensor window will fog up. For instance, the system may learn what conditions lead to condensation and proactively heat when such conditions are present The condensation sensor and heater assemblies of different condensation modules may be tailored for different types of sensors and/or different locations along the vehicle. As noted with regard to FIG. 5D, different interleaved patterns may be employed, for instance in conjunction with different spacing between the interleaved ITO elements. Lidars may operate at wavelengths on the order of about 890 nm-910 nm, while optical cameras may operate in the 400 nm-700 nm spectrum. Thus, for a given sensor operating at a particular wavelength (or band of wavelengths) the pitch between the ITO elements may be selected to be transparent at that wavelength (or band). In another example, the elements should be at least 95-98% transparent at the frequency(ies) of interest. Alternatively or additionally, the spacing may be adjusted or otherwise determined based on the condensation to be detected (e.g., ice crystals, snowflakes or water droplets) and/or the amount of condensation (e.g., covering a minimum percentage of the area of the sensor window, such as 10-35%, or more or less). According to one aspect of the technology, the thickness and physical layout of the ITO layer may depend on the specific sensor and a condensate size threshold that is to be detected. For instance, the condensate may be assumed to be liquid, with a thickness on the order of 0.1 mm, similar to the spacing between the ITO elements.

The condensation information may also be employed for cleaning the sensor covers using corresponding cleaning modules associated with the respective covers. Thus, upon detection of precipitation, in addition or alternatively to activating heating, a cleaning module can be actuated as needed to clean the sensor cover, such as by spraying water or blowing air onto the sensor window. For instance, in a scenario where there is an external condensate sensor, this sensor may be employed to activate a cleaning system. In this case, the cleaning system may remain active until the measured condensate level falls below a threshold. This could also be used for non-condensate fouling of windows, such as from bird droppings, mud, etc. The condensation information could also be employed by the system to account for surface obstruction, e.g., by weighting or discounting certain sensor information. By way of example, the system, if divided into sensor zones of specific areas, could be used to detect any obstruction (e.g., dirt or dust) on sensor windows.

As noted above, the technology is applicable for various types of vehicles, including passenger cars, buses, motorcycles, emergency vehicles, RVs, construction vehicles, and large trucks or other cargo carrying vehicles. In addition to using the condensation information for operation of an individual self-driving vehicle, this information may also be shared with other self-driving vehicles, such as vehicles that are part of a fleet, as well as with a back-end system for further evaluation. For instance, if different sensors of one vehicle are being affected due to fog, sleet or snow, other vehicles in that area may be notified so that they can use the information to activate sensor heating with their condensation modules or otherwise ensure their sensor systems are operating effectively. Also, condensation-related data obtained from one vehicle may be sent to a back end processing system. In turn, this information may be shared with other nearby vehicles or disseminated to the entire fleet. Furthermore, the technology is not limited to vehicles. Thus, it could be employed in any industry that transmits light through a lens or window where attenuation of the signal due to condensate would degrade the performance of the system. Photography, astronomy, telecommunications, and transportation could all make effective use of this system.

Figure 6A:
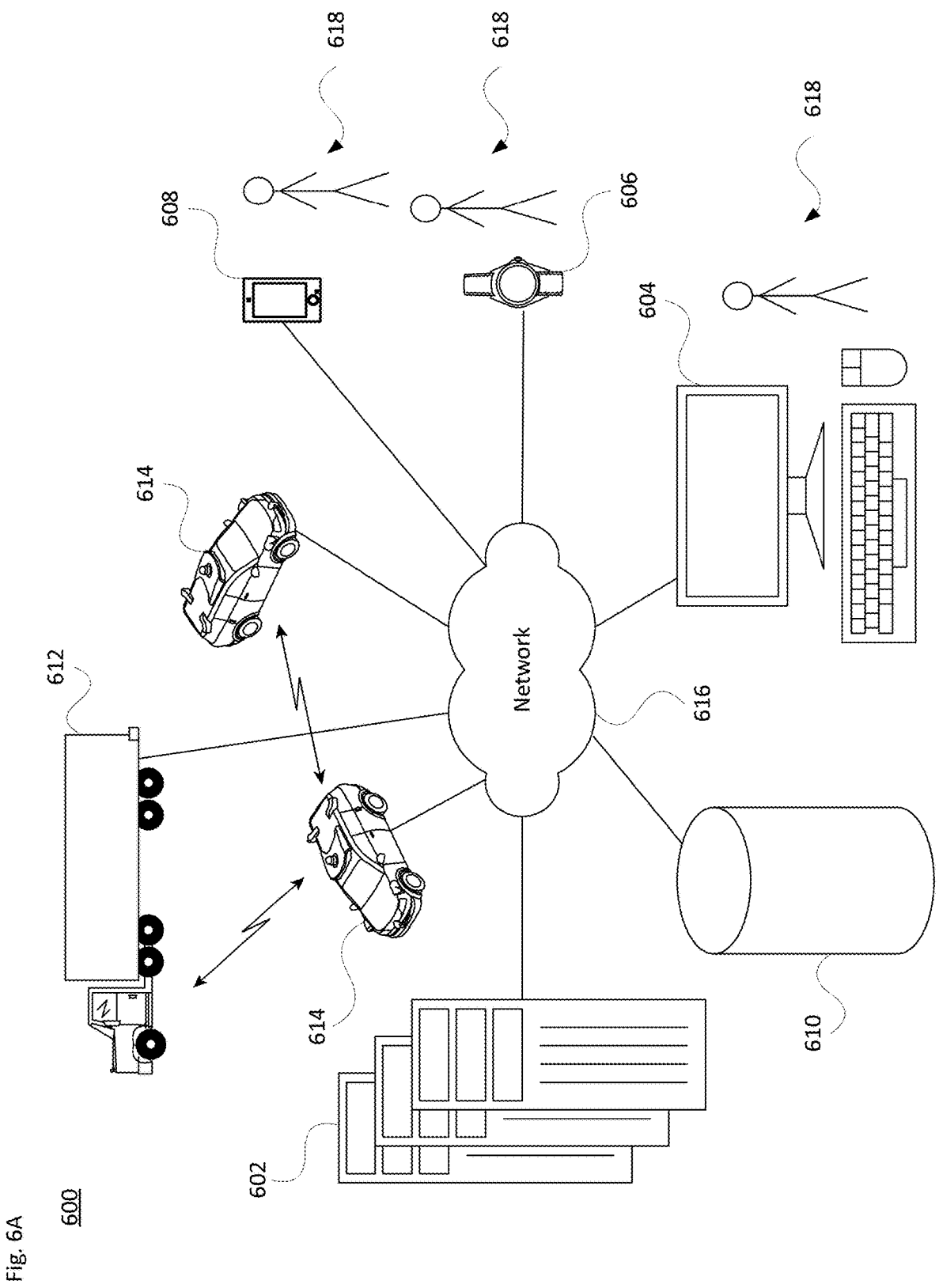
FIGS. 6A-B illustrate an example system in accordance with aspects of the technology.
Figure 6B:
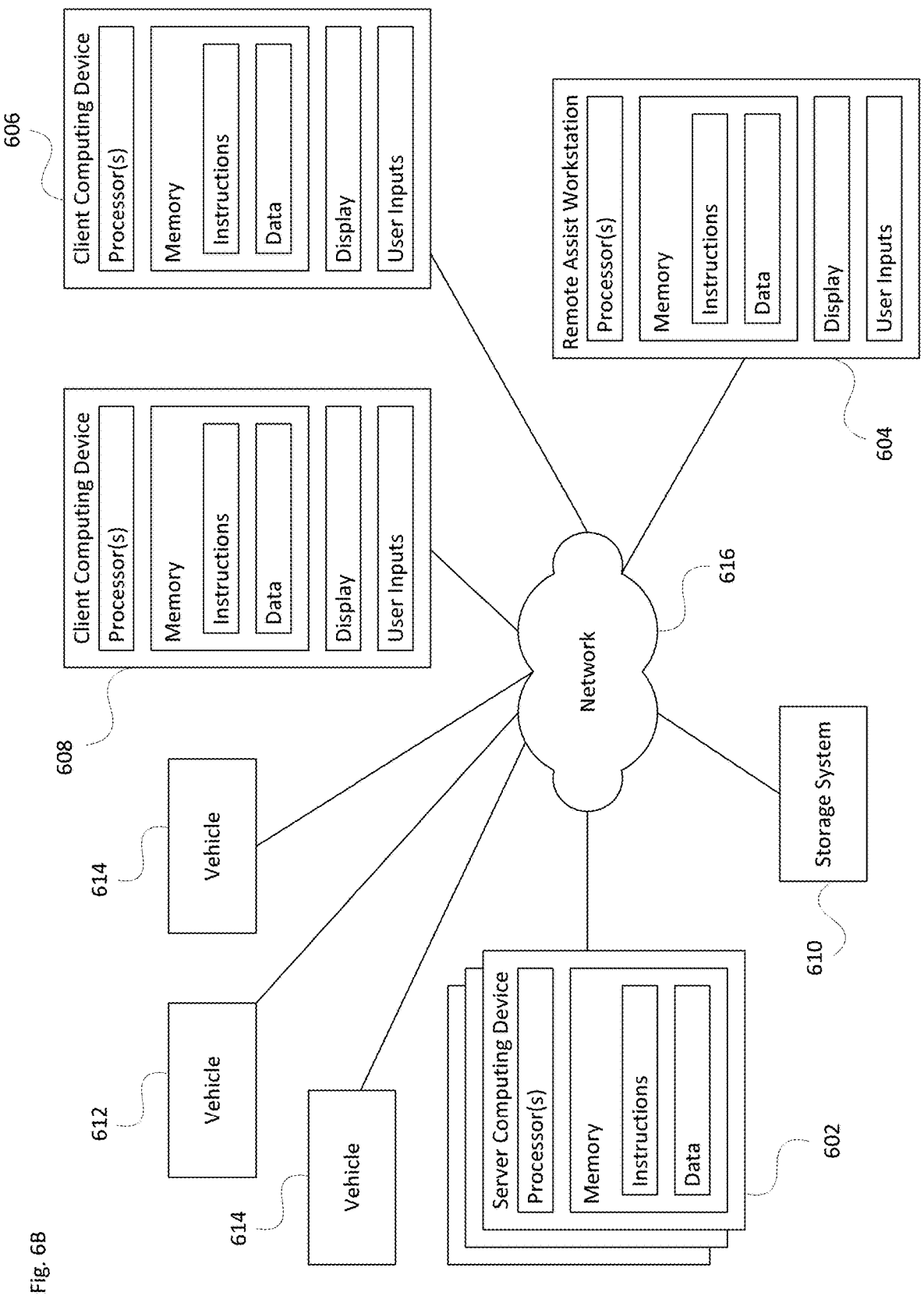

One example of such an arrangement is shown in FIGS. 6A and 6B. In particular, FIGS. 6A and 6B are pictorial and functional diagrams, respectively, of an example system 600 that includes a plurality of computing devices 602, 604, 606, 608 and a storage system 610 connected via a network 616. System 600 may also include vehicles 612 and/or 614 configured to operate in an autonomous driving mode, which may be configured the same as or similarly to the vehicles of FIGS. 1A-E. Vehicles 612 and/or vehicles 614 may be part of a fleet of vehicles. Although only a few vehicles and computing devices are depicted for simplicity, a typical system may include significantly more.

As shown in FIG. 6B, each of computing devices 602, 604, 606 and 608 may include one or more processors, memory, data and instructions. Such processors, memories, data and instructions may be configured similarly to the ones described above with regard to FIG. 2 or 3A.

The various computing devices and vehicles may communication directly or indirectly via one or more networks, such as network 616. The network 616, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 602 may include one or more server computing devices having a plurality of computing devices, e.g., a load balanced server farm, that exchange information with different nodes of a network for the purpose of receiving, processing and transmitting the data to and from other computing devices. For instance, computing device 602 may include one or more server computing devices that are capable of communicating with the computing devices of vehicles 612 and/or 614, as well as computing devices 604, 606 and 608 via the network 616. For example, vehicles 612 and/or 614 may be a part of a fleet of self-driving vehicles that can be dispatched by a server computing device to various locations. In this regard, the computing device 602 may function as a dispatching server computing system which can be used to dispatch vehicles to different locations in order to pick up and drop off passengers or to pick up and deliver cargo. In addition, server computing device 602 may use network 616 to transmit and present information to a user of one of the other computing devices or a passenger of a vehicle. In this regard, computing devices 604, 606 and 608 may be considered client computing devices.

As shown in FIG. 6A each client computing device 604, 606 and 608 may be a personal computing device intended for use by a respective user 618, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 606 and 608 may be mobile phones or devices such as a wireless-enabled PDA, a tablet PC, a wearable computing device (e.g., a smartwatch), or a netbook that is capable of obtaining information via the Internet or other networks.

In some examples, client computing device 604 may be a remote assistance workstation used by an administrator or operator to communicate with drivers of dispatched vehicles. Although only a single remote assistance workstation 604 is shown in FIGS. 6A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to perform a post-processing analysis of the condensation data from the condensation modules, for instance to identify a particular type of moisture/precipitation or to determine an effective heating approach to remove the condensation. [Does this make sense?]

Storage system 610 can be of any type of computerized storage capable of storing information accessible by the server computing devices 602, such as a hard-drive, memory card, ROM, RAM, DVD, CD-ROM, flash drive and/or tape drive. In addition, storage system 610 may include a distributed storage system where data is stored on a plurality of different storage devices which may be physically located at the same or different geographic locations. Storage system 610 may be connected to the computing devices via the network 616 as shown in FIGS. 6A-B, and/or may be directly connected to or incorporated into any of the computing devices.

Storage system 610 may store various types of information. For instance, the storage system 610 may also store autonomous vehicle control software which is to be used by vehicles, such as vehicles 612 or 614, to operate such vehicles in an autonomous driving mode. Storage system 610 may also store vehicle models and/or information about the sensor assemblies, condensation modules, etc. Such information may be updated and shared with specific vehicles or the entire fleet as needed. It may be updated in real time, periodically, or off-line as additional self-reflection information or other data is obtained. The storage system 610 can also include map information, route information, weather information, etc. This information may be shared with the vehicles 612 and 614, for instance to help with condensation analysis by the on-board computer system(s), such as during real-time driving by a particular vehicle when precipitation and/or fouling is detected at a given sensor.

Figure 7:
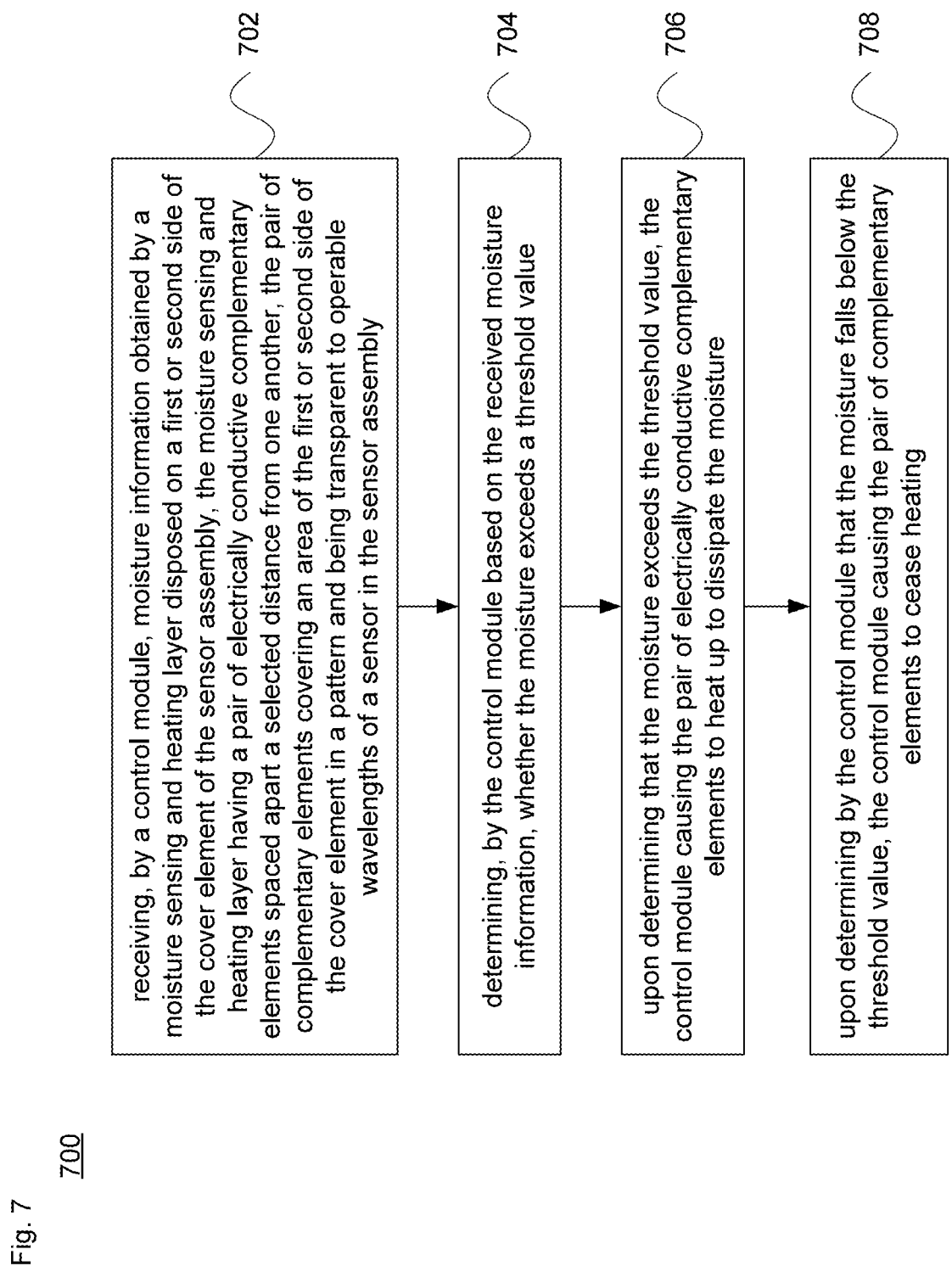
FIG. 7 illustrates a method in accordance with aspects of the technology.

FIG. 7 illustrates an example method of operation 700 in accordance with the above discussions. In particular, it provides a method of clearing moisture from a cover element of a sensor assembly. At block 702, the method includes receiving, by a control module, moisture information obtained by a moisture sensing and heating layer that disposed on a first or second side of the cover element of the sensor assembly. The moisture sensing and heating layer has a pair of electrically conductive complementary elements spaced apart a selected distance from one another. The pair of complementary elements covers an area of the first or second side of the cover element in a pattern and are transparent to operable wavelengths of a sensor in the sensor assembly. At block 704, the method includes determining, by the control module based on the received moisture information, whether the moisture exceeds a threshold value. At block 706, upon determining that the moisture exceeds the threshold value, the control module causes the pair of electrically conductive complementary elements to heat up to dissipate the moisture. And at block 708, upon determining by the control module that the moisture falls below the threshold value, the control module causing the pair of complementary elements to cease heating.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A sensor assembly, comprising:
 a cover element disposed in a window of the sensor assembly, the cover element being configured to pass signals of one or more wavelengths therethrough, the cover element having a first side and a second side opposite the first side;
 a sensor device configured to perform at least one of emit or receive signals of the one or more wavelengths through the cover element, the sensor device being disposed along the first side of the cover element;
 a moisture sensing and heating layer disposed on the first or second side of the cover element, the moisture sensing and heating layer having a pair of electrically conductive complementary elements spaced apart a selected distance from one another, the pair of electrically conductive complementary elements covering an area of the first or second side of the cover element in a pattern and being transparent to the one or more wavelengths; and
 a control module operatively coupled to the pair of electrically conductive complementary elements, the control module being configured to:
  detect presence of moisture along the cover element of the sensor assembly based on signals received from the pair of electrically conductive complementary elements,
  upon a determination from the signals that the moisture exceeds a threshold value, cause the pair of electrically conductive complementary elements to heat up to dissipate the moisture, and
  upon a determination from the signals that the moisture falls below the threshold value, cause the pair of electrically conductive complementary elements to cease heating.

2. The sensor assembly of claim 1, wherein the pair of electrically conductive complementary elements each comprises Indium Tin Oxide (ITO).

3. The sensor assembly of claim 2, wherein the ITO is disposed as a film on the first or second side of the cover element.

4. The sensor assembly of claim 3, wherein the film is formed lithographically.

5. The sensor assembly of claim 1, wherein the cover element comprises glass, polycarbonate, sapphire or silicon.

6. The sensor assembly of claim 1, wherein the pair of electrically conductive complementary elements spaced apart a selected distance according to a predetermined sensitivity level for moisture detection.

7. The sensor assembly of claim 6, wherein the selected distance is on the order of 0.1 mm.

8. The sensor assembly of claim 1, wherein the selected distance between the pair of electrically conductive complementary elements varies across different portions of the area of the first or second side of the cover element.

9. The sensor assembly of claim 1, wherein the pair of electrically conductive complementary elements is a first pair, and the moisture sensing and heating layer further includes one or more additional pairs of electrically conductive complementary elements, each of the pairs being arranged along a different portion of the area of the first or second side of the cover element.

10. The sensor assembly of claim 1, wherein the sensor device is a lidar sensor and the one or more wavelengths are between 890 nm-910 nm.

11. The sensor assembly of claim 1, wherein the sensor device is an image sensor and the one or more wavelengths are in the optical frequency band.

12. A vehicle configured to operate in an autonomous driving mode, the vehicle comprising:
 a control system having one or more processors configured to operate the vehicle in the autonomous driving mode based on objects and conditions in an environment external to the vehicle; and
 a perception system operatively coupled to the control system, the perception system being configured to detect one or more of the objects and conditions in the environment external to the vehicle, the perception system including the sensor assembly of claim 1 disposed along an exterior region of the vehicle.

13. The vehicle of claim 12, wherein the distance between the pair of electrically conductive complementary elements is selected according to an operating wavelength range of the sensor device.

14. A method, comprising:
- receiving, by a control module, moisture information obtained by a moisture sensing and heating layer disposed on a first or second side of a cover element of a sensor assembly, the moisture sensing and heating layer having a pair of electrically conductive complementary elements spaced apart a selected distance from one another, the pair of electrically conductive complementary elements covering an area of the first or second side of the cover element in a pattern and being transparent to operable wavelengths of a sensor in the sensor assembly;
- determining, by the control module based on the received moisture information, whether the moisture exceeds a threshold value;
- upon determining that the moisture exceeds the threshold value, the control module causing the pair of electrically conductive complementary elements to heat up to dissipate the moisture; and
- upon determining, by the control module that the moisture falls below the threshold value, the control module causing the pair of electrically conductive complementary elements to cease heating.

15. The method of claim 14, wherein the threshold value is a fixed value or is a variable stored in a lookup table.

16. The method of claim 14, wherein the threshold value is determined based on a type of the sensor of the sensor assembly.

17. The method of claim 14, wherein the threshold value is determined based on a location of the sensor assembly along a surface of a vehicle.

18. The method of claim 14, further comprising:
- receiving, by the control module, ambient information regarding one or more conditions external to the sensor assembly; and
- determining, by the control module, whether to preheat the pair of electrically conductive complementary elements based on the ambient information before the moisture exceeds the threshold value.

19. The method of claim 14, further comprising actuating a cleaning module to clean the cover element of the sensor assembly.

20. The method of claim 19, wherein the cleaning module is actuated upon determining whether the moisture exceeds the threshold value.

* * * * *